United States Patent [19]
Takeda

[11] Patent Number: 5,559,937
[45] Date of Patent: Sep. 24, 1996

[54] CLIPPING PROCESSING DEVICE, THREE-DIMENSIONAL SIMULATOR DEVICE, AND CLIPPING PROCESSING METHOD

[75] Inventor: Masaki Takeda, Toshima-ku, Japan

[73] Assignee: Namco LTD., Tokyo, Japan

[21] Appl. No.: 446,632

[22] PCT Filed: Sep. 28, 1994

[86] PCT No.: PCT/JP94/01597

§ 371 Date: May 25, 1995

§ 102(e) Date: May 25, 1995

[87] PCT Pub. No.: WO95/09405

PCT Pub. Date: Apr. 6, 1995

[30] Foreign Application Priority Data

Aug. 28, 1993 [JP] Japan .................................. 5-264411

[51] Int. Cl.$^6$ ................................................. G06F 15/00
[52] U.S. Cl. ................................................. 395/134
[58] Field of Search .................................. 395/134, 161, 395/155, 161; 345/113, 114, 118

[56] References Cited

U.S. PATENT DOCUMENTS 4,991,117  2/1991  Iwamura et al. ........................ 395/134
5,448,690  9/1995  Shiraishi et al. ........................ 395/133
5,455,897  10/1995  Nicholl et al. ........................ 395/134

FOREIGN PATENT DOCUMENTS 2-132572  5/1990  Japan .
3-240177  10/1991  Japan .

Primary Examiner—Phu K. Nguyen
Attorney, Agent, or Firm—Oliff & Berridge

[57] ABSTRACT

An optimized, fast clipping processing device for a 3D simulator device performs real-time image processing. An initial value is set in a priority register (170) by an initial-value setting section (152) and clipping surface index data is stored from an uppermost register toward lower registers. Clipping calculation for a polygon is performed by a clipping calculation section (200), using a clipping surface from index data read out sequentially by a reading section (190). If clip-out occurs with a certain clipping surface, index data for that clipping surface is written to an uppermost register of the priority register (170), and index data stored in lower registers is written sequentially downward. As a result, the priorities stored in the priority register (170) can be optimized, enabling the implementation of a faster clipping processing device.

20 Claims, 22 Drawing Sheets

FIG. 4A

| FRAME DATA | OBJECT DATA | POLY-GON DATA | POLY-GON DATA | --- | OBJECT DATA | POLY-GON DATA | POLY-GON DATA | --- | FRAME DATA | OBJECT DATA | POLY-GON DATA |
|---|---|---|---|---|---|---|---|---|---|---|---|

OBJECT 1 | OBJECT 2 (under FRAME 1); FRAME 2

FIG. 4B

| HEAD-ER | $I_0$ | $I_1$ | $I_2$ | $I_3$ | $T_{x0}$ | $T_{y0}$ | $T_{x1}$ | $T_{y1}$ | $T_{x2}$ | $T_{y2}$ | $T_{x3}$ | $T_{y3}$ | $X_0$ | $Y_0$ | $Z_0$ | $X_1$ | $Y_1$ | $Z_1$ | $X_2$ | $Y_2$ | $Z_2$ | $X_3$ | $Y_3$ | $Z_3$ |
|---|---|---|---|---|---|---|---|---|---|---|---|---|---|---|---|---|---|---|---|---|---|---|---|---|

VERTEX BRIGHT-NESS INFORMATION | VERTEX TEXTURE COORDINATES | VERTEX COORDINATES

FIG. 7A
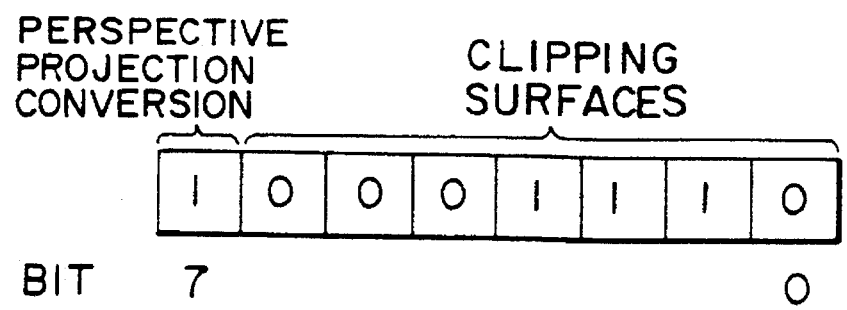
FIG. 7B
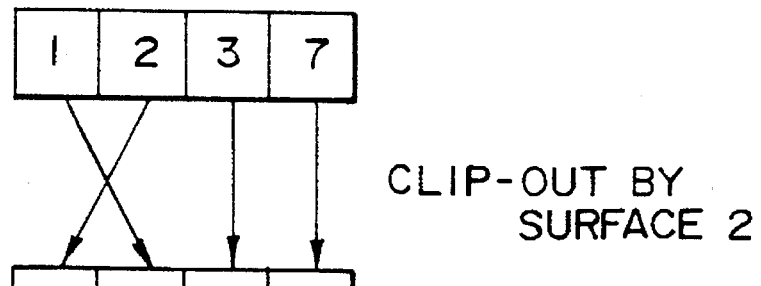
CLIP-OUT BY SURFACE 2
FIG. 7C
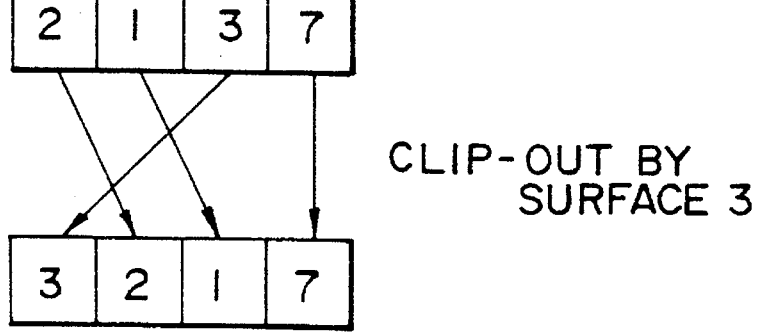
CLIP-OUT BY SURFACE 3
FIG. 7D

FIG.13A
| INPUT (BITS IN SEQUENCE: 2,1,0) | OUTPUT (BITS IN SEQUENCE: 7,6, ····· 0) |
|---|---|
| 0 0 0 | 1 0 0 0 0 0 0 0 |
| 0 0 1 | 1 1 0 0 0 0 0 0 |
| 0 1 0 | 1 1 1 0 0 0 0 0 |
| 0 1 1 | 1 1 1 1 0 0 0 0 |
| 1 0 0 | 1 1 1 1 1 0 0 0 |
| 1 0 1 | 1 1 1 1 1 1 0 0 |
| 1 1 0 | 1 1 1 1 1 1 1 0 |
| 1 1 1 | 1 1 1 1 1 1 1 1 |
FIG.13B
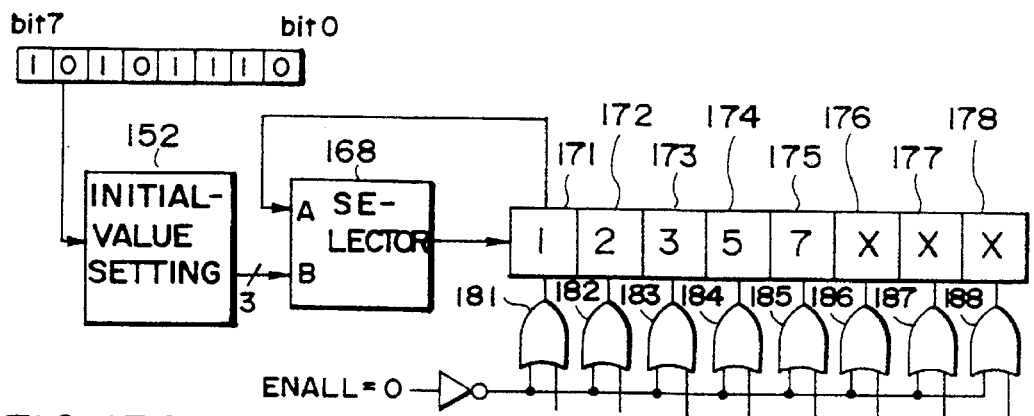
FIG.13C
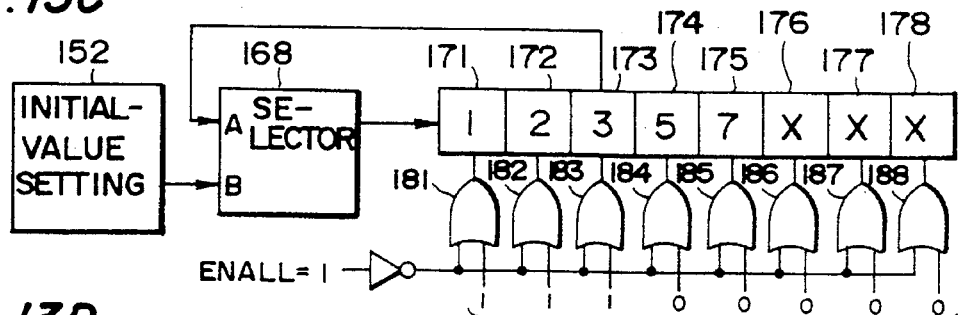
FIG.13D
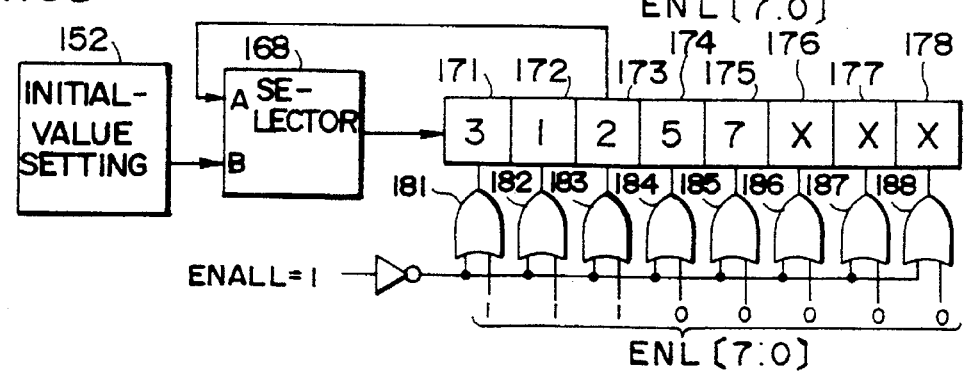

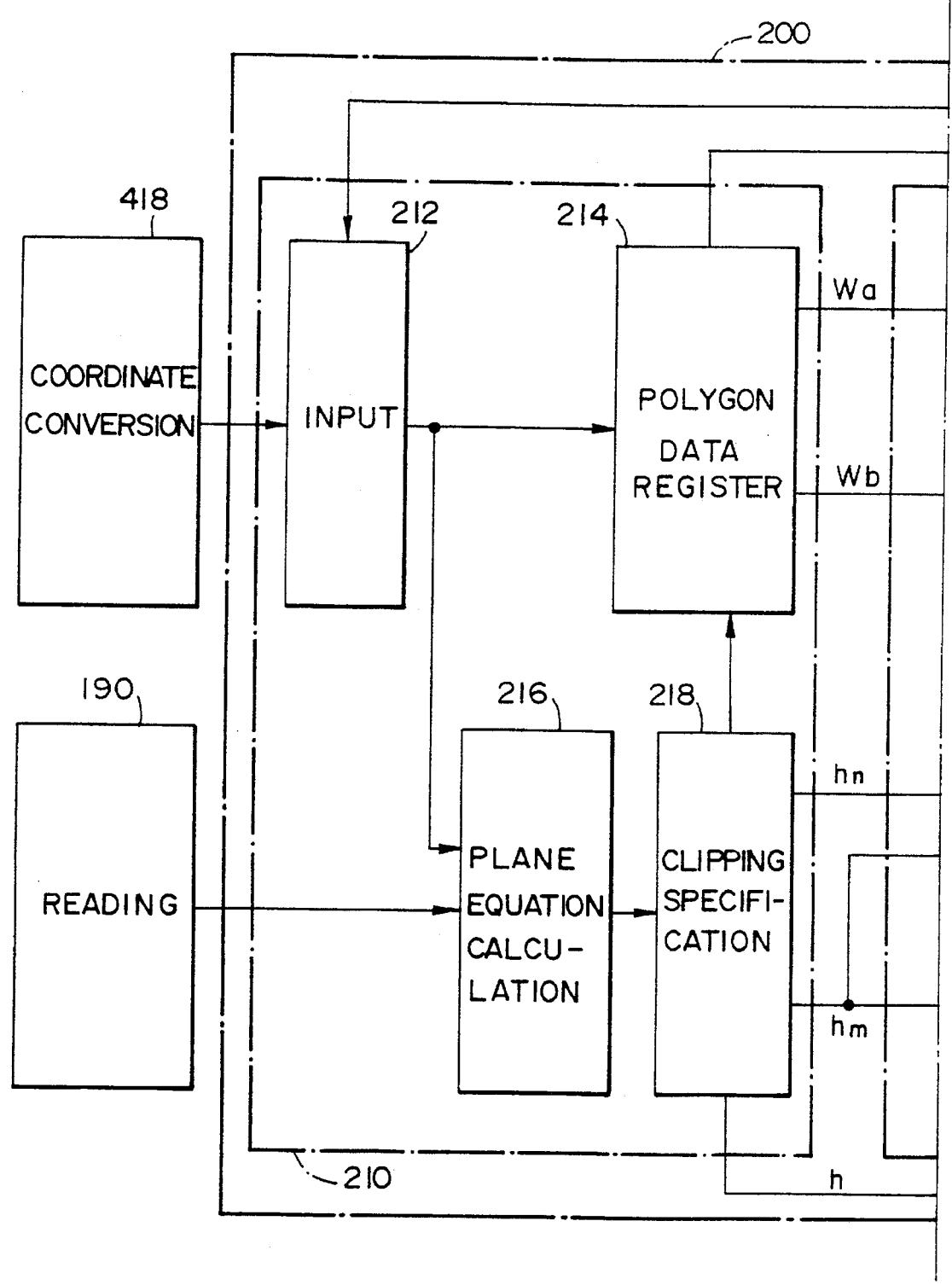

CLIPPING PROCESSING DEVICE, THREE-DIMENSIONAL SIMULATOR DEVICE, AND CLIPPING PROCESSING METHOD

TECHNICAL FIELD

This invention relates to a clipping processing device, a three-dimensional (3D) simulator device that uses such a clipping processing device, and a clipping processing method.

BACKGROUND OF ART

Various applications are known in the prior art as 3D simulator devices used in, for example, 3D games or piloting simulators for aircraft or various vehicle. In a 3D simulator device shown in FIG. 9, image information relating to a 3D object 300 is previously stored in the device. This 3D object 300 represents a display object that a player (observer) 302 can see via a screen 306. Image Information of the 3D object 300 is subjected to perspective projection conversion on the screen 306 so that a pseudo-3D image (projected image) 308 is displayed on the screen 306. With this device, if the player 302 performs an operation such as a rotation or translation using a control panel 304, given 3D calculation processing is performed on the basis of a control signal thereof. A calculation is first performed to determine whether there is a change in a factor such as the viewpoint position or line-of-sight direction of the player 302 or the position or direction of the moving vehicle in which the player 302 is seated. Next, a calculation is performed to determine how the image of the 3D object 300 will appear on the screen 306 in response to this change in the viewpoint position and line-of-sight direction, or other change. The above calculation processing is performed in real time to follow the actions of the player 302. This enables the player 302 to experience a virtual 3D space in which a change in scenery concomitant with a change in the player's own viewpoint position and line-of-sight direction or a change in the position and direction of the moving vehicle can be seen in real time as a pseudo-3D image.

An example of the 3D simulator device of this invention is shown in FIG. 18. Note that the description below proceeds on the assumption that the 3D simulator device is applied to a 3D game.

As shown in FIG. 18, the 3D simulator device of this invention is configured of a control section 510, a virtual 3D space calculation section 500, an image synthesis section 512, and a CRT 518.

The virtual 3D space calculation section 500 sets a virtual 3D space in accordance with control signals from the control section 510 and a games program stored in a central processing section 506. In other words, it performs calculations to determine what the position of the 3D object 300 is and in what direction is it arranged.

The image synthesis section 512 comprises an image supply section 514 and an image forming section 516. The image synthesis section 512 performs image synthesis of a pseudo-3D image in accordance with setting information on a virtual 3D space from a virtual 3D space calculation section 500.

3D objects that configure a virtual 3D space are represented by this 3D simulator device as polyhedrons divided into 3D polygons. For example, the 3D object 300 shown in FIG. 17 is represented as a polyhedron divided into 3D polygons (1) to (6) (polygons (4) to (6) are not shown in the figure). Coordinates and accompanying data (hereinafter called vertex image information) for each vertex of these 3D polygons are stored in a 3D image information memory section 552.

Various types of calculation such as rotation or translation with respect to this vertex image information and various types of coordinate conversion such as perspective projection conversion are performed by the image supply section 514 in accordance with setting information of the virtual 3D space calculation section 500. After the vertex image information that has been subjected to this calculation processing has been converted in line with a given sequence, it is output to the image forming section 516.

The image forming section 516 comprises a polygon generation circuit 570 and a palette circuit 580, and the polygon generation circuit 570 comprises an outline point calculation section 324 and a line processor 326. Calculation processing to paint the dots within polygons with given color data is performed by the image forming section 516 in the sequence described below.

First of all, left and right outline points that are the intersections between the outline of a polygon and a scan line are calculated in the outline point calculation section 324. The portion bounded by these left and right outline points is then painted in the specified color by the line processor 326. The thus-painted color data is subsequently converted into RGB data in the palette circuit 580 and is output to the CRT 518.

With the 3D simulator device of the above configuration, the calculations described below are performed by the image supply section 514.

Taking a driving game as an example, as shown in FIG. 19, 3D objects 300, 333, and 334 representing objects such as a steering wheel, a building, and a billboard, which are read out from the 3D image information memory section 552 are arranged in a 3D space expressed by a world coordinate system (XW, YW, ZW). Subsequently, image information representing those 3D objects is subjected to coordinate conversion to a viewpoint coordinate system (Xv, Yv, Zv) based on the viewpoint of the player 302.

Next, a type of image processing that is called clipping processing is performed. Clipping processing is image processing whereby image information that is outside the field of view of the player 302 (or outside the field of view of a window opening into the 3D space), in other words, image information that is outside a region bounded by clipping surfaces 1, 2, 3, 4, 5, and 6 (hereinafter called a display region 20), is excluded. The image information necessary for subsequent processing by this 3D simulator device is only the image information that is within the field of view of the player 302. This means that, if all other information could be excluded, the load during subsequent processing could be reduced. Although there are objects in all directions around the player 302, if it could be arranged such that only those of the objects that are within the field of view are processed, the quantity of data to be processed subsequently can be greatly reduced, so that the 3D simulator device executes only essential image processing during real-time image processing.

This is described below in more detail with reference to FIG. 19. Image information on an object outside the field of view of the player 302 (outside the display region 20), such as the 3D object 334 representing a billboard that has moved out of the field of view and backwards, is excluded. This exclusion processing is performed by determining whether or not an object is within a display region for each of the clipping surfaces 1 to 6, then excluding the object only if it is outside all of those surfaces.

In contrast thereto, for the 3D object 333 of a building or the like that is on the boundary of the display region 20, the part thereof that is outside the display region 20 is excluded, and only the part that is within the display region 20 is used in subsequent image processing. The image information of the 3D object 300 of the steering wheel or the like, which is completely included within the display region 20, is used as is in the subsequent image processing.

Finally, perspective projection conversion to the screen coordinate system (XS, YS) is performed only for objects within the display region 20, then sorting processing is performed.

Since the clipping processing ensures a huge reduction in the amount of image data used in the image processing after the clipping processing, this type of 3D simulator device can perform essential image processing.

However, as shown in FIG. 19, this clipping processing has to be performed for all of the clipping surfaces 1 to 6, and in practice the image processing regulates the speed of the entire circuitry of this 3D calculation section 316 the most.

In particular, a 3D simulator device that has to perform image processing of a pseudo-3D image in real time, in other words a device creates a display screen every 1/60 second, a drop in speed will lead directly to a deterioration in image quality, causing major problems. Thus the implementation of faster, optimized clipping processing for this type of 3D simulator device has become the technical subject.

DISCLOSURE OF THE INVENTION

This invention has been devised in the light of the above technical concerns and has as its objective the provision of an optimized, fast clipping processing device, particularly for a three-dimensional simulator device that performs real-time image processing.

In order to achieve this objective, a first aspect of this invention concerns a clipping processing device for performing clipping processing using a plurality of clipping surfaces on a three-dimensional object represented by a plurality of polygons, comprising:

a priority memory means for storing clipping surface priorities which has a storage means for storing index data specifying the clipping surfaces to be used in clipping processing, and stores the index data in a sequence in which clipping processing is executed, starting at an uppermost storage location of the storage means and proceeding downward;

an initial-value setting means for setting an initial value for the index data with respect to the priority memory means;

a reading means for reading said index data of the clipping surface from the priority memory means;

a priority modification means for modifying said index data that has been read by the reading means and rewriting modified data to the priority memory means; and a clipping calculation means for performing clipping calculation with respect to a polygon to be processed, using said clipping surfaces specified by said index data read out by the reading means in sequence from the uppermost storage location of the storage means; wherein:

the clipping calculation means comprises inside/outside decision means for determining whether said polygon to be processed is in one of a display region, a boundary region, or an out-of-display region of the clipping surfaces; an interior-division-point calculation means for calculating interior division points between the polygon and the clipping surface when the inside/outside decision means determines that the polygon is in the boundary region; and means for performing calculation processing that invalidates the polygon when the inside/outside decision means determines that the polygon is in the out-of-display region; and the priority modification means comprises means for transferring index data of the clipping surface to the uppermost storage location of the storage means when the clipping calculation means determines that said polygon to be processed is in the out-of-display region of the clipping surface.

In accordance with this aspect of the invention, an initial value for the index data is set in the priority memory means by the initial-value setting means. When it is determined that a polygon to be processed is in an out-of-display region with respect to a clipping surface, index data of the clipping surface is transferred to the uppermost storage location of the storage means. As a result, when clipping processing is performed sequentially for polygons comprising the same three-dimensional object, the priorities written in the priority memory means can be optimized. This enables a statistical reduction in the clipping processing time, which can greatly increase the clipping processing speed. As a result, optimal clipping processing device can be provided, particularly for a three-dimensional simulator device that performs real-time image synthesis.

In a second aspect of this invention, the priority modification means comprises means for transferring index data of the clipping surface to the uppermost storage location of the storage means, and also transferring index data that have been stored in starting from the uppermost storage location and ending one position higher than an original location of the index data to be transferred to the uppermost storage location sequentially downwards to lower storage locations, when the clipping calculation means determines that the polygon to be processed is in the out-of-display region of the clipping surface.

In accordance with this aspect of the invention, when it is determined that a polygon to be processed is in an out-of-display region with respect to a clipping surface, not only are index data of the clipping surface transferred to the uppermost storage location of the storage means, but also the other index data are transferred sequentially downward to lower storage locations. This ensures that index data for a clipping surface that could easily cause clipping-out are stored in sequence from the top of the storage means. As a result, if clipping-out becomes impossible with the clipping surface specified by the uppermost index data, clipping-out by the clipping surface specified by the next index data becomes possible, thus enabling a further reduction in clipping processing time.

A third aspect of this invention further comprises means for performing preprocessing for the entirety of a 3D object, before clipping processing is performed on a polygon that configures the three-dimensional object;

wherein the preprocessing means comprises:

preprocessing decision means for setting a zone for trivial clipping of a given width shaped in such as manner as to include the clipping surface, and determining whether the three-dimensional object is in any of a display region, a boundary region, or an out-of-display region of the zone; and means for omitting clipping processing for a polygon that configures the three-dimensional object when the preprocessing decision means determines that the three-dimensional object is in the display region or out-of-display region of the zone, and for specifying that clipping processing is performed for a polygon that configures the three-dimensional object when it is determined that the three-dimensional object is in the boundary region of the zone.

In accordance with this aspect of the invention, it is previously determined whether each three-dimensional object is in one of a display region, boundary region, or out-of-display region of a zone for trivial clipping. If it is determined that the three-dimensional object is in the display region or out-of-display region of this zone, clipping processing is not performed for the polygons of this three-dimensional object. As a result, the total volume of processing can be greatly reduced, and the clipping processing speed can be greatly reduced.

In a fourth aspect of this invention, the interior-division-point calculation means within the clipping calculation means comprises means for performing perspective projection conversion with respect to a polygon to be processed, by modifying calculation coefficients that are used in interior-division-point calculation.

In accordance with this aspect of the invention, since not only clipping processing but also perspective projection conversion processing can be performed by one clipping processing device, it is possible to design a reduction in the scale of the hardware. As a result, the cost performance of the device can be increased.

A fifth aspect of this invention further comprises means for setting the initial value set by the initial-value setting means for each three-dimensional object configured of polygons, in accordance with a display state of the three-dimensional object.

In accordance with this aspect of the invention, since an initial value can be set for the priority of each three-dimensional object, it is possible to perform optimal clipping processing by modifying this initial value in accordance with the display state of the three-dimensional object.

A sixth aspect of this invention concerns a three-dimensional simulator device that comprises the above described clipping processing device, wherein the three-dimensional simulator device further comprises:

an image synthesis means for synthesizing a field-of-view image as seen from an observer within a virtual three-dimensional space, using a polygon which has been subjected to clipping processing by the clipping processing device.

In accordance with this aspect of the invention, the number of polygons that must be handled by the image synthesis means can be greatly reduced by performing clipping processing by a clipping processing device, enabling the provision of a three-dimensional simulator device that is capable of real-time image synthesis.

BRIEF DESCRIPTION OF THE DRAWINGS

FIGS. 4A and 4B show an example of the format of data handled by this embodiment;

FIGS. 7A, 7B, 7C, and 7D are schematic illustrative diagrams of an example of initial mode specification data and priority specification data, and the operation of overwriting data in the clipping register;

FIGS. 13A, 13B, 13C, and 13D are schematic illustrative diagrams of the operations of the decode signal and priority register;

FIGS. 15 and 15(a)–15(c) are the block diagram of a schematic circuit configuration of the clipping calculation section;

BEST MODE FOR CARRYING OUT THE INVENTION

Table of Contents of Embodiments

1. Description of Overall 3D Simulator Device
2. Description of Image Supply Section
   1) Initialization
   2) Frame Data Transfer
   3) Object Data Transfer
   4) Operation of Coordinate Conversion Section, etc
3. Description of Clipping Processing Device
   1) Configuration and Operation
   2) Application Examples
   3) Trivial Acceptance/Rejection
4. Specific Examples
   1) Priority Modification Section, Priority Register, etc.

2) Clipping Calculation Section

3) Increase in Processing Speed by Priority Modification and Parallel Connection 1. Description of Overall 3D Simulator Device The overall configuration of this 3D simulator device will first be described.

Figure 2:
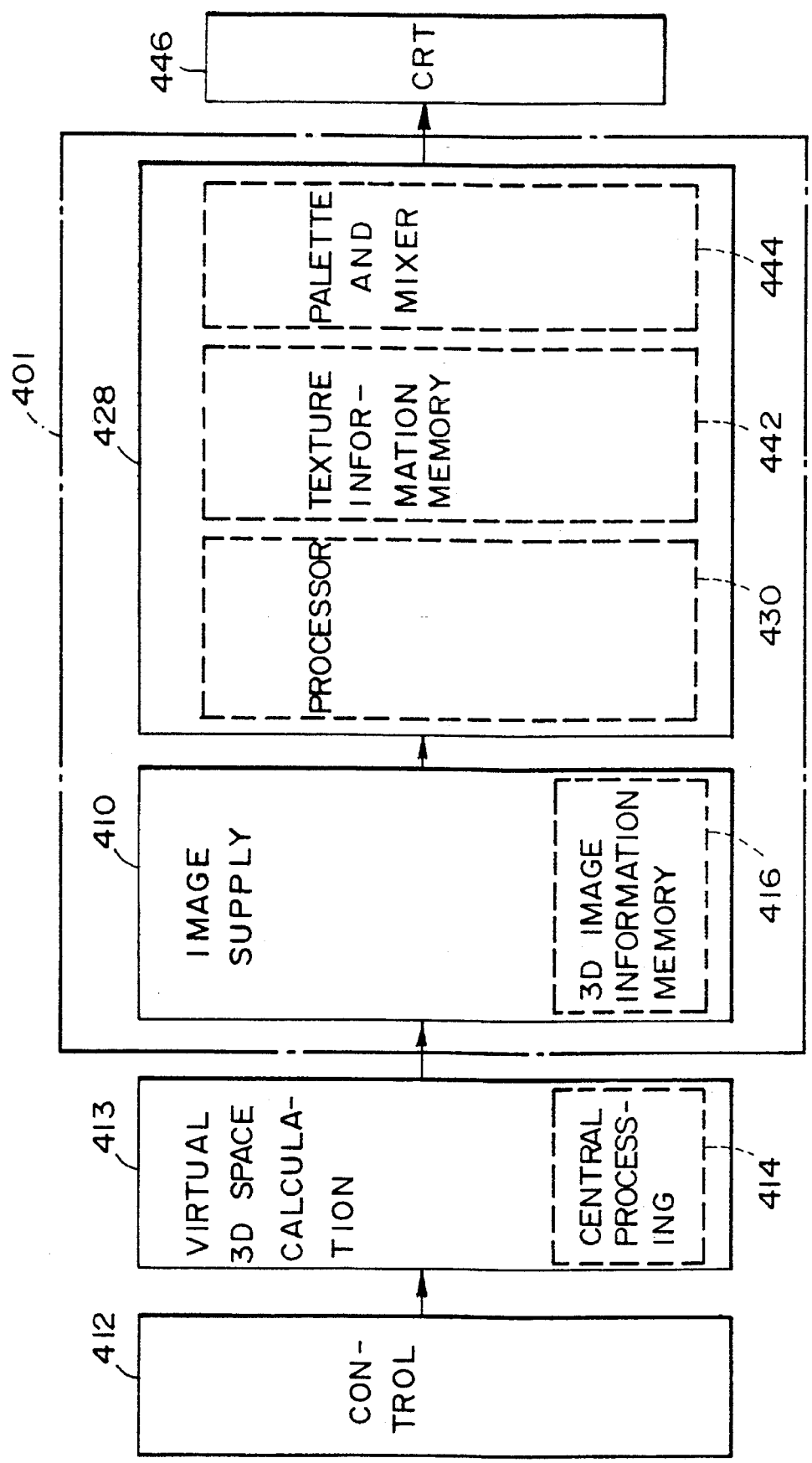
FIG. 2 a block diagram of an example of a 3D simulator device to which the clipping processing device according to this invention is applied.

As shown in FIG. 2, this 3D simulator device comprises a control section 412, a virtual 3D space calculation section 413, an image synthesis section 401, and a CRT 446. The image synthesis section 401 comprises an image supply section 410 and an image forming section 428. Note that the description below proceeds on the assumption that the 3D simulator device is applied to a 3D game.

The virtual 3D space calculation section 413 sets a virtual 3D space in accordance with control signals from the control section 412 and a games program stored in a central processing section 414. Virtual 3D space setting information configured of position/direction information of 3D objects that configure the virtual 3D space (such as an enemy aircraft, a mountain, and a building) and position/field-of-view direction information of the player is calculated and then output to the image supply section 410 within the image synthesis section 401.

Predetermined calculation processing is performed by the image supply section 410 in accordance with this virtual 3D space setting information. To be specific, calculations such as coordinate conversion from an absolute coordinate system to a viewpoint coordinate system, clipping processing, perspective projection conversion, and sorting processing are performed in this section, then data is output to the image forming section 428. In this case, the output data is expressed as data that is divided into polygons, more specifically it is configured of vertex image information such as position coordinates, texture coordinates, and other accompanying information for each vertex. The configuration and operation of this image supply section 410 will be described in detail later.

The image forming section 428 is designed to calculate intra-polygon image information on the basis of vertex image information provided for each vertex of this polygon, then output it to the CRT 446

Image synthesis is performed by methods called texture mapping and Gourand shading in this 3D simulator device, to provide a higher quality image. The concepts of these methods are described below in detail.

Figure 3:
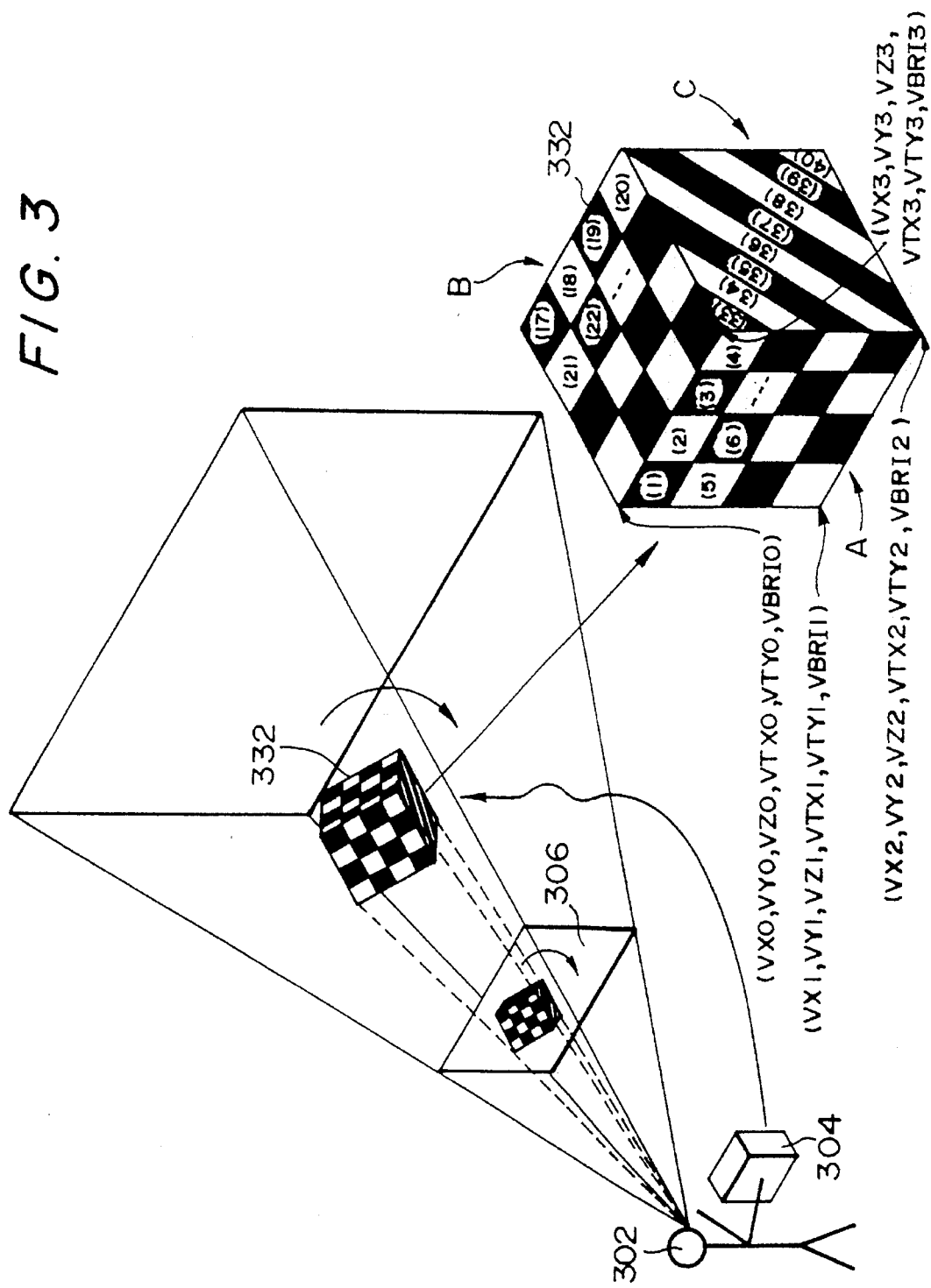
FIG. 3 is a schematic diagram for illustrating the concept of texture mapping.

The concept of the texture mapping method is shown in FIG. 3.

In the prior art, to synthesize the image of a 3D object 332 having patterns such as checks or stripes, as shown in FIG. 3, the 3D object is divided into 3D polygons (1) to (80) (3D polygons (41) to (80) are not shown in the figure) and image processing is performed with respect to all of these polygons, because painting out one polygon can only be performed with one specified color. As a result, the number of polygons required to synthesize a high-quality image with a complicated pattern increases greatly, and thus it becomes impossible to synthesize a high-quality image of this type.

With this 3D simulator device, processing such as rotation, translation, coordinate conversion for perspective projection conversion, and clipping of the 3D object 332 is performed for each of 3D polygons A, B, and C configuring the surfaces thereof, (to be specific, each of the vertices of these 3D polygons) and the checked or striped pattern is handled as a texture that is separated from the polygon processing. A texture information memory section 442 is provided within the image forming section 428 shown in FIG. 2, and image information (texture information) to be applied to each of the 3D polygons, such as a checked or striped pattern, is stored therein The address in the texture information memory section 442 that specifies this texture information is given as texture coordinates VTX, VTY for each vertex of each of the 3D polygons. More specifically, texture coordinates (VTX0, VTY0), (VTX1, VTY1), (VTX2, VTY2), and (VTX3, VTY3) are specified for each vertex of polygon A shown in FIG. 3.

Texture coordinates TX, TY for all of the dots within the polygon are obtained by a processor section 430 within the image forming section 428 from the texture coordinates VTX, VTY for each of these vertices. Texture information corresponding to the thus-obtained texture coordinates TX, TY is read out from the texture information memory section 442 and is output to the palette and mixer circuit 444. This enables the synthesis of a 3D object covered with a texture such as checks or stripes, as shown in FIG. 3.

The 3D simulator device represents the 3D object 332 as a 3D polygonal solid as described above. Therefore the continuity of brightness information at boundaries of each 3D polygon causes a problem. For example, if an attempt is made to represent a sphere by using a plurality of 3D polygons and the same brightness is set for all the dots within each 3D polygon, a state would occur in which the boundaries of each 3D polygon would not be represented as "rounded," although it is desired to represent them as "rounded" in practice. The 3D simulator device of this invention avoids this problem by a method called Gourand shading. With this method, brightness information VBRI0 to VBRI3 for each vertex is given for each vertex of the 3D polygons, as shown in FIG. 3, in a similar manner to that of the above described texture mapping method, and brightness information for all the dots in the 3D polygon is obtained by interpolation from the brightness information VBRI0 to VBRI3 for each of these vertices when the image is finally displayed by the image forming section 428.

As described above, the 3D simulator device is configured to use texture mapping and Gourand shading methods to enable fast image processing of a high-quality image. Thus the polygon image information is configured as a plurality of data items formed into a string, such as vertex display coordinates, vertex texture coordinates, and vertex brightness information for each polygon. There is also object data that is common data for identical 3D objects and frame data that is common data for identical frames. An example of the data format therefor is shown in FIG. 4. However, a major technical concern concerns the question of how data, (which consists of a plurality of data items formed into one string, as shown in this figure) should be processed efficiently and appropriately within the image supply section 410.

Note that, in order to simplify the description below, vertex brightness information items VBRI0 to VBRI3 are represented in FIG. 4 as I0 to I3; vertex texture coordinates VTX0 to VTY3 are represented as TX0 to TY3; and vertex coordinates VX0 to VI3 are represented as X0 to I3.

2. Description of Image Supply Section

Figure 5:
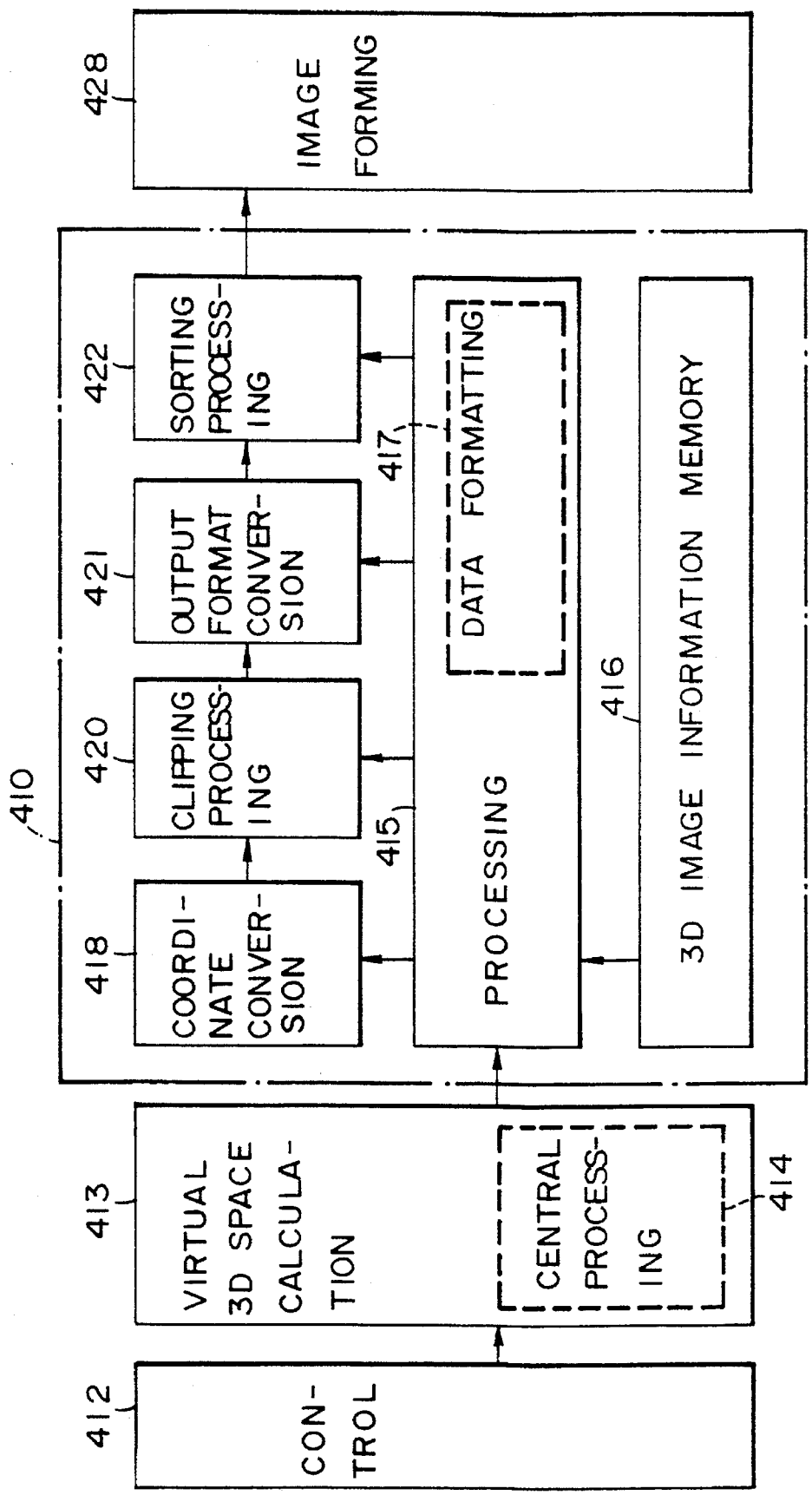
FIG. 5 a block diagram of an example of the image supply section to which the clipping processing device according to this invention is applied.

The image supply section 410 comprises a processing section 415, a 3D image information memory section 416, a coordinate conversion section 418, a clipping processing device 420, an output format conversion section 421, and a sorting processing section 422, as shown in FIG. 5.

The description below of the configuration and operation of the image supply section 410 relates to an example of an application to a 3D simulator device for a driving game.

1) Initialization

When the power of this 3D simulator device is turned on, image information for 3D objects that representing objects such as a racing car, a steering wheel, and a road which are elements configuring the driving game, are written to the 3D image information memory section 416 from the virtual 3D space calculation section 413 (central processing section 414) through the processing section 415. The 3D simulator device performs various types of image calculation processing such as coordinate conversion, rotation, and translation on this 3D object image information to form a virtual 3D space for driving.

Note that if the 3D image information memory section 416 configured of ROM, this write is not necessary.

2) Frame Data Transfer

Viewpoint information that i s common to all of the 3D objects, in other words, information on the viewpoint position, angle, and angle-of-view of the player and monitor information, is updated every frame (for example, every ⅟60 second), and is transferred from the virtual 3D space calculation section 413 to the coordinate conversion section 418 through the processing section 415. Various types of coordinate conversion are performed on the basis of this data by the coordinate conversion section 418.

Monitor information, such as its angle and size, is also transferred as clipping processing data to the clipping processing device 420. The clipping processing device 420 calculates factors such as clipping surfaces for performing clipping processing on the basis of this data, and performs the clipping processing.

The thus-transferred data is called frame data, and a header is set for each frame, as shown in FIG. 4A.

3) Object Data Transfer

In order to create the virtual 3D space, the various 3D objects representing the racing car, steering wheel, and road which are elements configuring the driving game must be arranged in given positions in the virtual 3D space. Therefore, object number and position information, which indicates which 3D object and where it is positioned, is necessary. Data such as this object number and position information is transferred from the virtual 3D space calculation section 413 to the processing section 415.

Image information on the corresponding 3D object is then read out from the 3D image information memory section 416 as an address for this object number. In other words, if, for example, the object number specifies a racing car, image information for this racing car is read out from the 3D image information memory section 416. Image information on elements such as a racing car is stored in the 3D image information memory section 416 as a plurality of polygons (a polyhedron). The processing section 415 forms data that is called object data and polygon data from this read-out data in a data formatting section 417 and sequentially transfers it to the coordinate conversion section 418 onward.

In this case, "object data" means position and rotation information for the racing car that is a 3D object, and other accompanying data. "Polygon data" is data in which the image information for this racing car is divided into polygons, configured of vertex display coordinates, vertex texture coordinates, and vertex brightness information for each polygon, together with other accompanying data. This data is sent on by the data formatting section 417 to the next stage in the data format shown in FIG. 4.

Note that data for setting clipping surfaces on each object is also included within this object data, as will be described below.

4) Operation of Coordinate Conversion Section, etc

The polygon data is subjected to various types of coordinate conversion by the coordinate conversion section 418, on the basis of the player's viewpoint information transferred from the processing section 415 and the racing car's position and rotation information transferred from the processing section 415. In other words, rotation in the local coordinate system, parallel movement to the world coordinate system, and rotation to the viewpoint coordinate system are performed on the polygon data.

The polygon data that has been subjected to this coordinate conversion is then subjected to clipping processing by the clipping processing device 420. The plane equation for performing this clipping processing is that transferred as described above as frame data. Note that details of this clipping processing will be described later.

Each polygon that has been deformed into a polygonal shape by the clipping processing is subjected to processing by the output format conversion section 421 that converts it into a four-sided polygon, for example. The data whose format has been converted is output to the next-stage sorting processing section 422.

3. Description of Clipping Processing Device

1. Configuration and Operation

Figure 1:
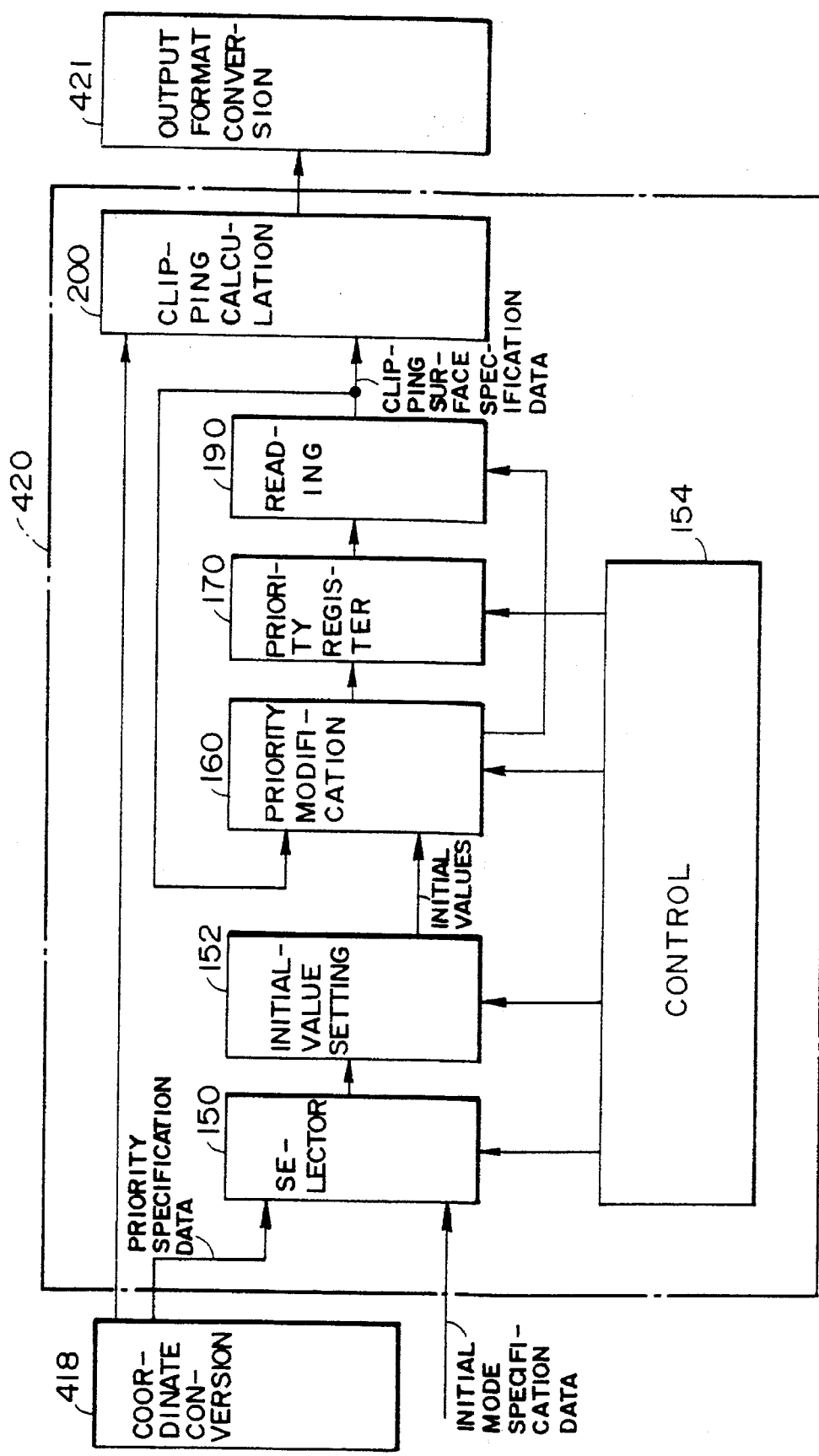
FIG. 1 is a block diagram of a preferred example of the clipping processing device according to this invention.

The clipping processing device 420 relating to this embodiment comprises a priority register (priority memory means) 170 that stores clipping surface index data according to a certain priority, a reading section 190 that reads index data from the priority register 170, a priority modification section 160 that modifies data from the priority register 170, a selector 150, an initial-value setting section 152 that sets an initial value in the priority register according to the data input from the selector 150, a control section 154 that controls the entire device, and a clipping calculation section 200, as shown in FIG. 1.

Figure 19:
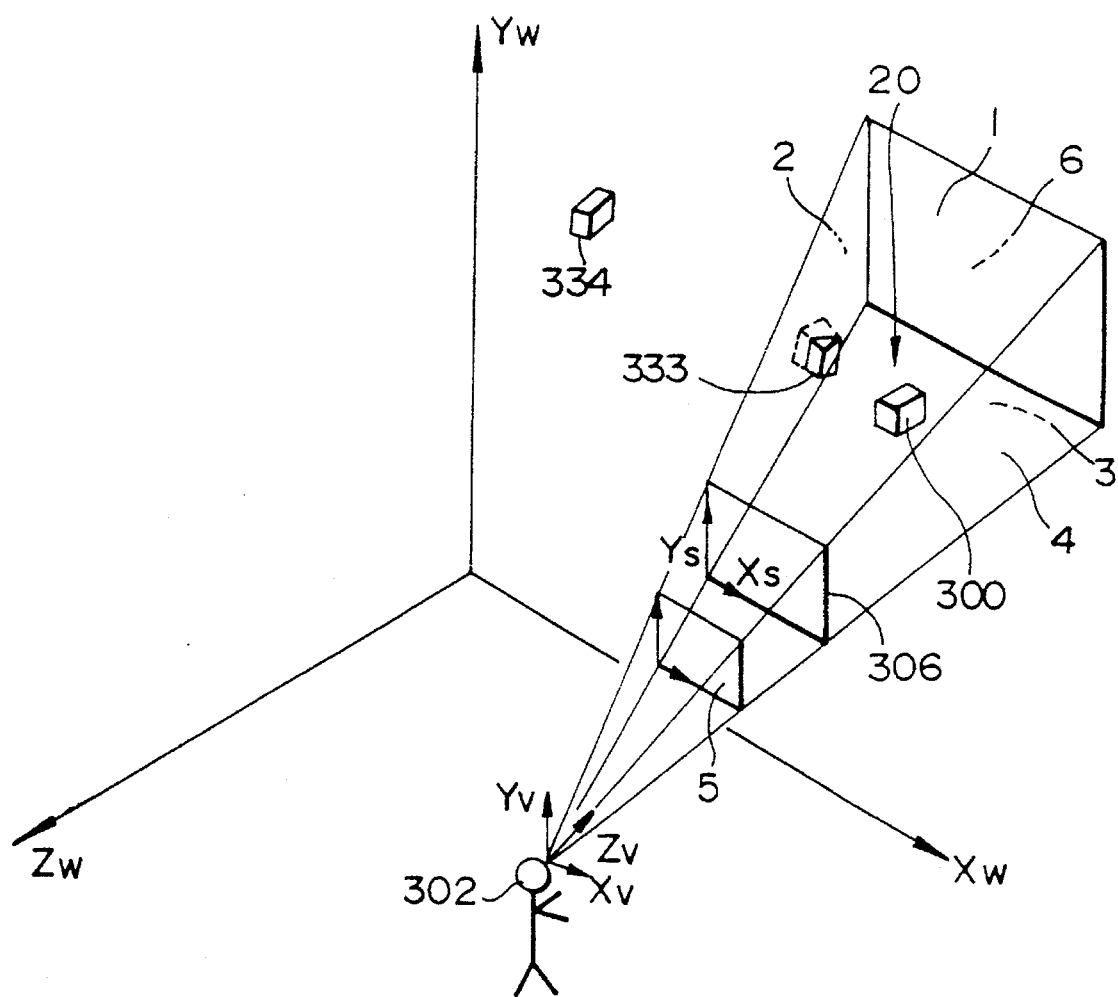
FIG. 19 is a schematic diagram for illustrating the image processing calculations performed by the image supply section.

The clipping processing and perspective projection conversion is performed by the clipping calculation section 200. An inside/outside decision is performed with respect to each of clipping surfaces 1 to 6 to determine whether or not each of the polygons configuring the 3D objects 300, 333, and 334 shown in FIG. 19 is within the display region 20.

For example, since all of the polygons configuring the 3D object 334 are completely outside the display region 20, the image information therefor is excluded from the data to be subjected to the subsequent image processing. Since all of the polygons of the 3D object 300 are within the display region 20, the image information therefor is used as is in the subsequent image processing. For the 3D object 333 that is on the boundary of the display region 20, the part thereof that is outside the display region 20 is excluded, and only the part that is within the display region 20 is used in subsequent image processing. In this case, the points at which the boundary cuts are calculated and new polygon data is created therefrom.

Finally, perspective projection conversion to the screen coordinate system (XS, YS) is performed only for objects within the display region 20, then is transferred to the next stage. In this case, since clipping processing and perspective projection conversion are similar calculations, mathematically speaking, the clipping calculation section 200 is set up in such a manner that it can calculate this clipping processing and perspective projection conversion with exactly the same configuration.

The clipping processing device 420 according to this embodiment is configured in such a manner that the clipping processing by a plurality of clipping surfaces and perspective projection conversion can be performed by one or a plurality of clipping processing devices.

The connections shown in the above FIGS. 1 and 5 are those for a case in which the clipping processing for all of the clipping surfaces and the perspective projection conversion are performed by only one clipping processing device 420. If such a connection configuration is used, the clipping processing device 420 operates as described below.

Figure 6A:
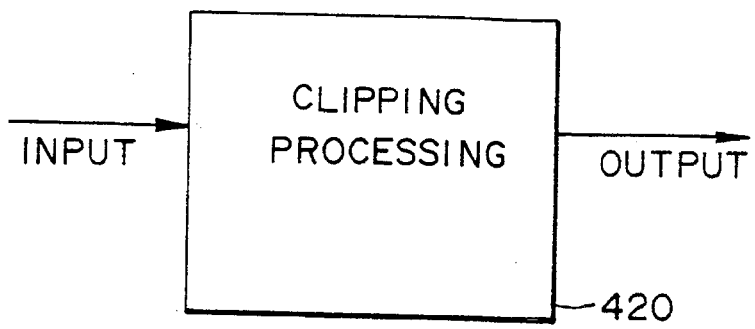
FIGS. 6A, 6B, and 6C are schematic illustrative diagrams of the clipping processing device according to this embodiment used in re-entrant mode.
Figure 6B:
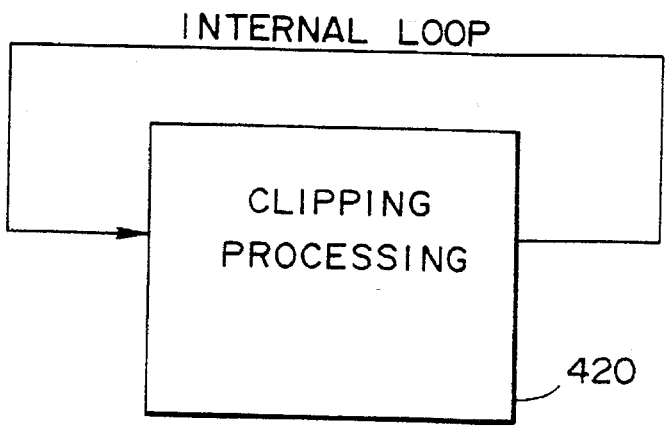

First of all, as shown in FIG. 6A, new data is input after data that has been subjected to processing has been output, and the clipping processing in accordance with the first of the clipping surfaces to be used is performed. Subsequently, as shown in FIG. 6B, an internal loop connecting the input and output is formed. This returns data that has been subjected to clipping processing by the first of the clipping surfaces, to the input, then clipping processing in accordance with the next clipping surface is performed on this returned data.

After clipping processing has been performed in this manner in accordance with a previously determined sequence of clipping surfaces, the perspective projection conversion is performed, the internal loop is removed, and data is output to the next-stage output format conversion section 421.

Note that the mode in which an internal loop of this type is formed, previously processed data is returned to the input, and clipping processing and perspective projection conversion are sequentially performed thereon is called re-entrant mode.

Figure 6C:
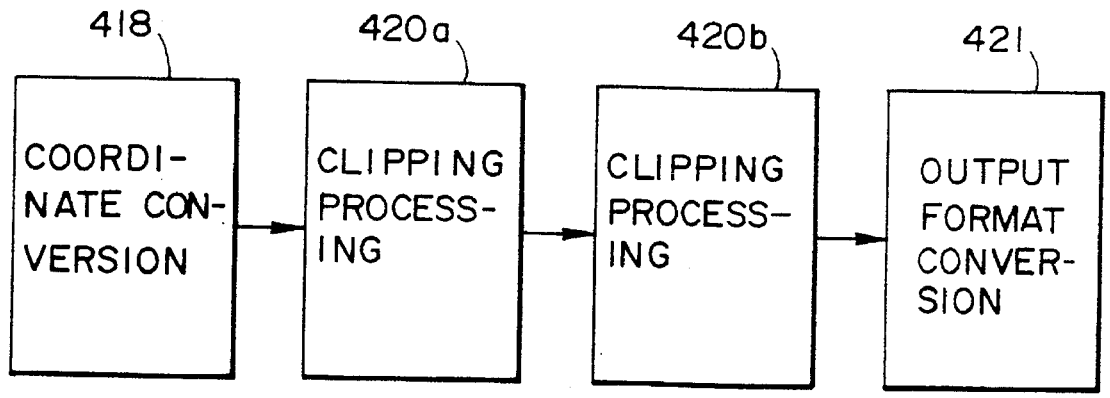

An example of the above described processing by using a plurality of the clipping processing device is shown in FIG. 6C. In this case, for example, clipping processing by a first three clipping surfaces is performed by a first-stage clipping processing device 420a, and clipping processing by the remaining three surfaces and perspective projection conversion is performed by a second-stage clipping processing device 420b. If clipping processing devices are connected in series in this manner and processing between these clipping processing devices is performed by pipeline processing, the speed of clipping processing can be greatly increased. However, note that in this case the number of clipping processing devices would increase, but from the point of view of hardware savings, it is advantageous to perform the clipping processing with only one clipping processing device.

In the priority register 170 is stored data that specifies in what clipping surface sequence the clipping processing is to be performed within the clipping processing device. To be specific, index data that specifies clipping surfaces for performing clipping processing is stored in the sequence in which processing is to be performed.

The initial-value setting section 152 is intended to set an initial value in this priority register 170, and the setting of this initial value is performed in accordance with initial mode specification data and priority specification data that is selected and input by the selector 150. In this case, the initial mode specification data is data that is set at a reset of the entire 3D simulator device. The priority specification data is data included within the object data shown in FIG. 4, and enables the specification of clipping surface priorities in units of 3D object.

An example of this initial mode specification data and priority specification data is shown in FIG. 7A. This data consists of, for example, 8-bit data, where bits 0 to 6 are used to specify clipping surfaces and bit 7 is used to specify whether or not perspective projection conversion is to be performed. A 0 in a bit means that the specification is not performed; a 1 means that it is performed. The sequence of clipping processing and perspective projection conversion processing is specified in sequence from the least significant bit (LSB) of the bits shown in FIG. 7A.

With the initial mode specification data set as shown in FIG. 7A, bits 1, 2, 3, and 7 being 1 means that clipping processing is performed in the sequence of clipping surfaces 1, 2, and 3 then perspective projection conversion is performed and output.

Note that at most six clipping surfaces are sufficient for clipping processing for a 3D space, as shown in FIG. 19. However, this embodiment is configured in such a manner that it is possible to have clipping processing with up to seven surfaces, as shown in FIG. 7A. This is useful for producing visual effects such as having a character in a game disappear into a wall or the like, when the 3D simulator device is applied to a game. In other words, it is possible to produce the visual effect of a character disappearing into such a wall by setting the remaining clipping surface to be this wall.

When the power of the 3D simulator device is turned on, the initial mode specification data is input to the initial-value setting section 152. If the initial mode specification data is the data whose contents are shown in FIG. 7A, for example, the priority register 170 is set by the initial-value setting section 152 to the initial state shown in FIG. 7B (the sequence of 1, 2, 3, then 7). This ensures that clipping processing is performed for the first polygon in the sequence of clipping surfaces 1, 2, and 3, and finally perspective projection conversion is performed.

Assume that, in this case, clipping-out of a certain polygon is caused by clipping surface 2. When that happens, the processing by the clipping processing device 420 is halted and the data written in the priority register 170 is modified by the priority modification section 160. To be specific, clipping surface 2 is placed at the head of the contents of the priority register 170 and the processing position for clipping surface 1 is moved one step downward, so that, as a result, the processing sequence is modified to surfaces 2, 1, 3, then 7. This means that the clipping processing with respect to the next polygon is performed in the sequence of clipping surfaces 2, 1, and 3.

If clipping-out then occurs with clipping surface 3, the contents of the priority register 170 are modified to the sequence of 3, 2, 1, then 7, as shown in FIG. 7D.

When this clipping processing with respect to all the polygons configuring the 3D object has ended, the priority specification data corresponding to the next 3D object to be processed is set in the priority register 170 through the initial-value setting section 152. Note, however, that the initial value of this priority specification data for each 3D object can be any value, and it is not always necessary to set this value for every 3D object. If it is not set, clipping processing for the subsequent polygon is performed according to the contents of the priority register 170 that were set at the end of the previous round.

This priority specification data is included in the object data; more specifically, it is stored as accompanying data for each 3D object within the 3D image information memory section 416 of FIG. 2. This priority specification data could also be previously set by a program that creates a virtual 3D space, for example. Locations arranged within the virtual 3D space are, to a certain extent, predetermined, and thus if priority specification data could be set with respect to a 3D object for a clipping surface that causes clipping that can be anticipated to a certain degree from the first, it would be possible to implement an increase in clipping processing speed.

2) Application Examples

The above described methods implement a huge increase in clipping processing for this embodiment, but further discussion of whether these methods are effective in increasing the clipping processing speed is given below with reference to FIGS. 8A to 8D.

To simplify the description, the examples shown in FIGS. 8A to 8D concern clipping processing within a 2D space. In these figures, assume that a region bounded by clipping surfaces 1 to 4 is the display region 20. Conversely, assume that a region outside the display region 20 is called an out-of-display region 18. A region on the boundary of the clipping surfaces 1 to 4 is a boundary region 19.

Figure 8A:
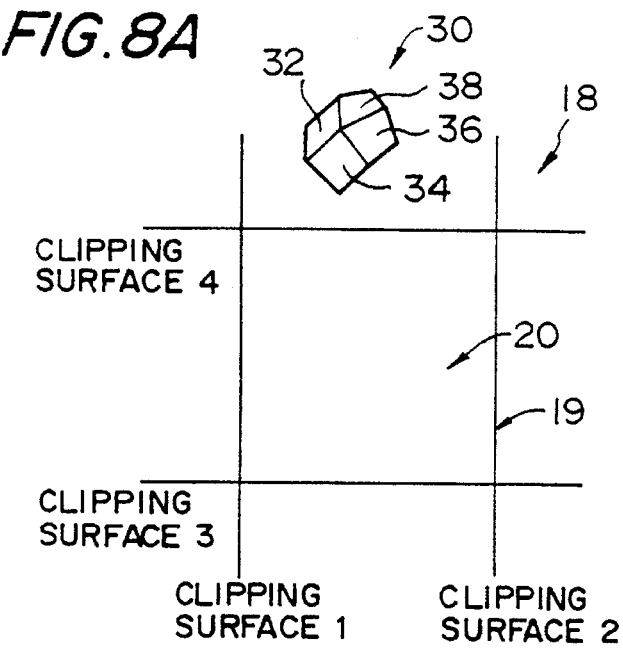
FIGS. 8A, 8B, 8C, 8D, and 8E are schematic illustrative diagrams concerning an example of the application of the clipping processing device according to this embodiment.

First consider a case in which clipping processing is performed in the sequence of clipping surfaces 1, 2, 3, and 4 for a polygon 32 configuring a 3D object 30 in FIG. 8A. In this case, since it is determined that all vertices of the polygon 32 are within the display region 20 by the clipping processing for the clipping surfaces 1, 2, and 3, these vertices are not clipped out by these clipping surfaces. Therefore, three time units are necessary up to that point in this case. However, since it will be determined that all of the vertices of the polygon 32 are in the out-of-display region 18 with respect to the next clipping surface 4, this will cause the polygon 32 to be clipped out. As a result, this clipping processing requires a total of four time units.

However, only the processing for the final clipping surface 4 is actually necessary, so that other processing is completely wasted. Therefore, means of reducing this unnecessary processing has become a subject of research.

An object (3D object) has a constant size as one of the general properties thereof, and thus it is possible to state that polygons that configure the same 3D object are statistically "close." In other words, if one polygon that configures a 3D object is clipped out by a certain clipping surface, it can be said to be highly likely that other polygons configuring the same 3D object will also be clipped out by that clipping surface. Therefore, when a certain polygon has been clipped out by the clipping surface 4, if the other polygons within the same object could be subjected to clipping processing starting from that clipping surface, it is possible that the processing time will be statistically reduced.

Figure 8B:
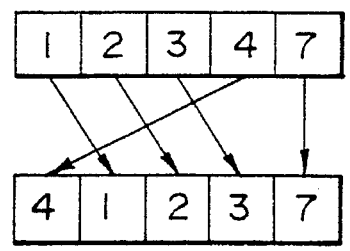

The description below concerns the application of this method to an arrangement of the 3D object 30 shown in FIG. 8A. If a polygon 32 thereof is clipped out by the clipping surface 4, the contents of the priority register 170 are changed to the sequence of 4, 1, 2, 3, then 7, as shown in FIG. 8B. Therefore, clipping processing for the next polygon 34 starts from clipping surface 4, and that polygon is clipped out at the start. Thus three time units are saved. In the same manner, three time units are saved for each of polygons 36 and 38. The processing time for the first polygon 32 is no different from that when this method is not used, but there is absolutely no wastage in processing time with the second and subsequent polygons 34 and 38, so that each takes one time unit. This means that, if the number of polygons is sufficiently high, the time necessary for processing the 3D object 30 is reduced to approximately ¼ in comparison with the case in which this method is not used.

Figure 8C:
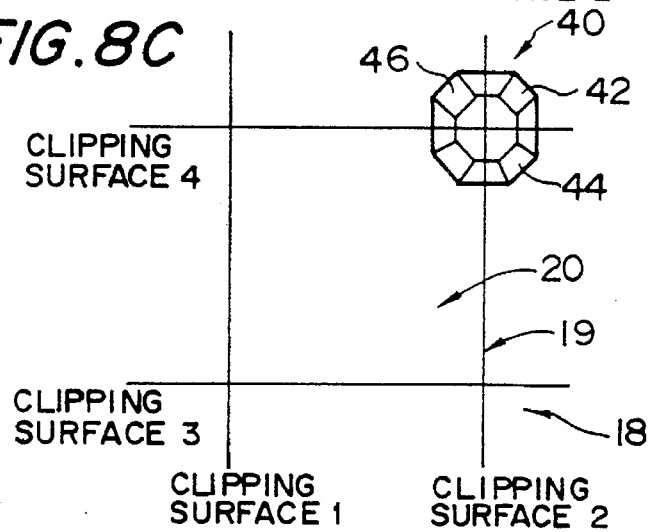
Figure 8D:
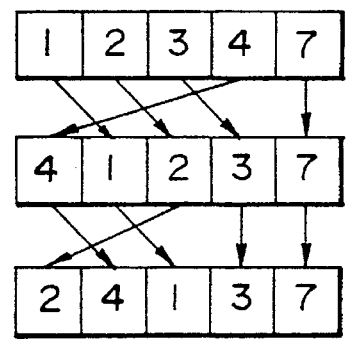

The description below concerns the application of this method to an arrangement of a 3D object 40 shown in FIG. 8C. If a polygon 42 thereof is clipped out by the clipping surface 4, the contents of the priority register 170 are changed to the clipping surface sequence of 4, 1, 2, then 3, as shown in FIG. 8D.

If an attempt is then made to perform clipping processing for a polygon 44, for example, the polygon 44 is not clipped out by the clipping surface 4 but it is clipped out by the clipping surface 2. Therefore, the contents of the priority register 170 are changed to the sequence of 2, 4, 1, then 3. In this case, the clipping surface 4 that provided the previous clipping-out is moved one step down. If an attempt is then made to perform clipping processing for a polygon 46, for example, it is not clipped out by the clipping surface 2 but it is clipped out by the clipping surface 4 which is stored in the next step within the priority register 170. Therefore, although processing is not possible in the shortest time of one time unit, it can be performed in two time units, and thus a saving in processing time can be achieved.

Note that initialization of this embodiment can be performed with priority specification data in which an optimal clipping surface sequence is previously set for each 3D object as described above. In other words, it is highly likely that the configuration of the created virtual 3D space will cause the 3D object 40 shown in FIG. 8C to be clipped out by the clipping surfaces 4 and 2, for example. In this case, if the priority specification data within the object data for the 3D object 40 is specified in such a manner that clipping surface processing sequence is 4, 2, 1, then 3, for example, the processing time necessary during the processing of the polygon 42 can be reduced.

The savings in processing time provided by this method are not limited to the case of clipping processing performed sequentially for polygons within the same 3D object. For example, this method is also effective for saving on processing time when the sequence in which image processing is performed is previously set by a games program or the like in such a manner that processing is in sequence starting from 3D objects at positions that are as close as possible. To be specific, the processing sequence could be set by a games program or the like in such a manner that 3D objects 60, 62, and 64 in FIG. 8E, which are mutually close to each other, are processed in sequence. This ensures that the data format shown in FIG. 4 and formed by the data formatting section 417 creates the sequence of 3D objects 60, 62, then 64. With this configuration, if the 3D object 60 is first of all clipped out by the clipping surface 4, it is highly likely that the 3D object 62 that is close thereto will also be clipped out by the clipping surface 4, so this method makes it possible to save on processing time.

3) Trivial Acceptance/Rejection

Figure 8E:
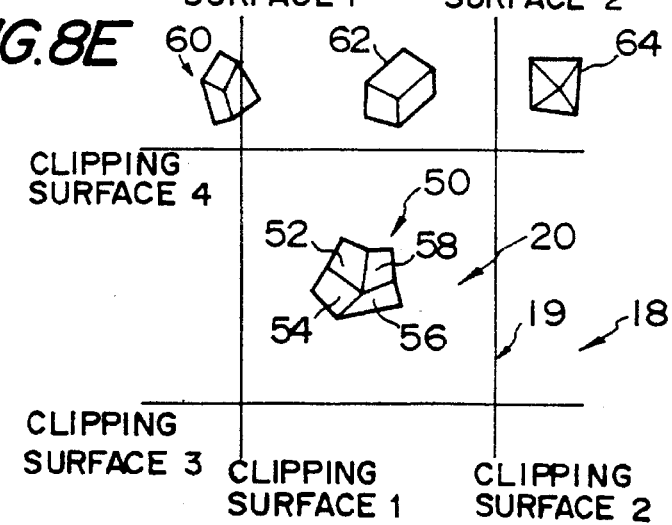

With the method described above, if all of polygons 52 to 58 of a 3D object 50 shown in FIG. 8E, for example, are within the display region 20, a processing time of four time units is required for each of these polygons.

In this case, a trivial accept/reject method (hereinafter called trivial clipping processing) described below can be used in combination with the above method.

Figure 9:
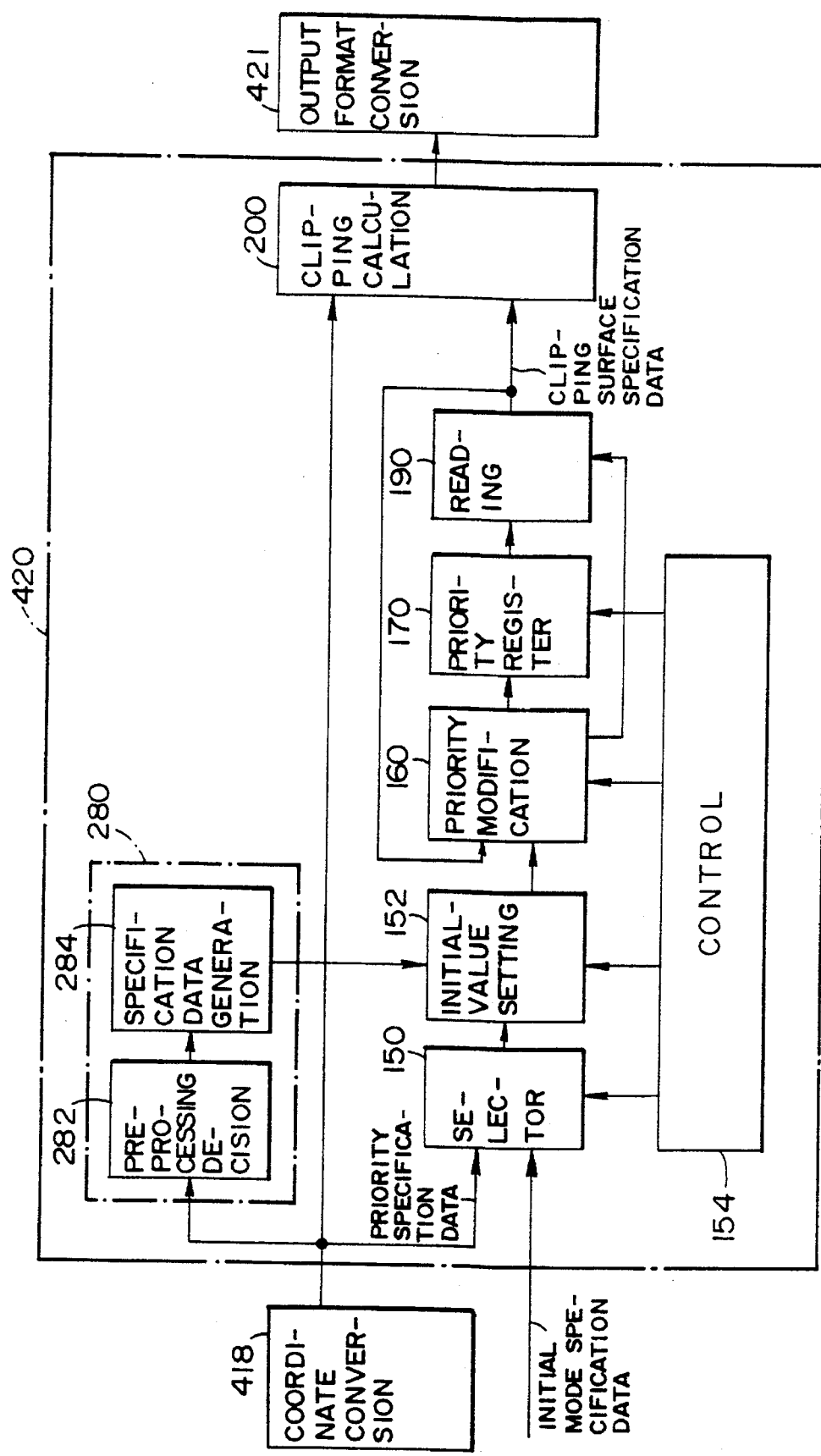
FIG. 9 is a block diagram of the configuration of the clipping processing device when trivial clipping processing is performed.

The configuration used for this trivial clipping processing is shown in FIG. 9. As shown in this figure, the configuration further comprises a preprocessing section 280.

The preprocessing section 280 comprises a preprocessing decision section 282 that performs an inside/outside decision by a trivial clipping surface and a specification data generation section 284 that forms specification data that is to be output to the initial-value setting section 152, based on the decision result.

The operation of this preprocessing section 280 will now be described with reference to FIG. 10. To simplify the description, the application example shown in this figure concerns clipping processing within a 2D space First of all, the coordinates of representative points of the 3D object 50 and an object length L are read out to the preprocessing decision section 282. Average values of the vertex coordinates of the 3D object could be used as the coordinates of these representative points. The maximum length of the lengths between each pair of vertices of the 3D object could be used as the object length L. These representative points and object length L are set as part of the object data shown in FIG. 4.

These settings fake the 3D object 50 as a circle (or a sphere in a 3D space) with center coordinates that are the coordinates of these representative points and radius L.

Figure 10:
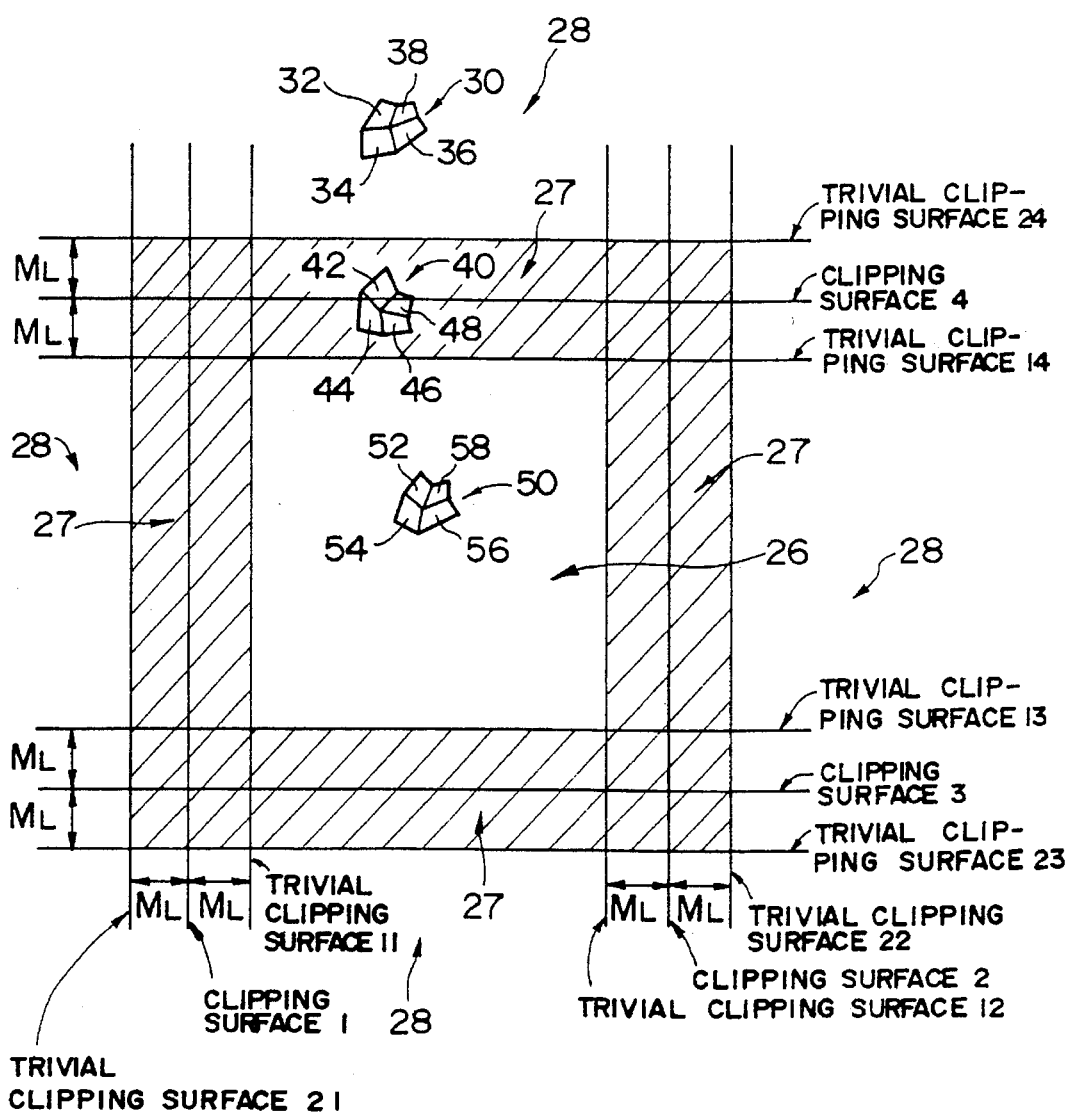
FIG. 10 is a schematic diagram for illustrating the trivial clipping processing method.

The preprocessing decision section 282 then sets a zone for trivial clipping formed by trivial clipping surfaces 11 to 4 and 21 to 24 (the shaded area in FIG. 10). It is then determined whether the 3D object 50 that is faked as this circle (sphere) is within one of a boundary region 27 that is a region on this zone, a display region 26 that is a region on an inner side surrounded by this zone, or an out-of-display region 28 that is a region on the outer side of this zone. In this case, the trivial clipping surfaces 11 to 14 are clipping surfaces that are set just a maximum length ML on the inner sides of the clipping surfaces 1 to 4, and the trivial clipping surfaces 21 to 24 are clipping surfaces that are set just the maximum length ML on the outer sides of the clipping surfaces 1 to 4. Note that the maximum length ML is the maximum of the object lengths L of all the 3D objects.

This inside/outside decision determines that the 3D object 50 in FIG. 10, for example, is in the display region 26 and clipping processing is not necessary for the polygons 52 to 58 configuring that 3D object 50. Therefore, in this case, specification data for which perspective projection conversion is performed, not clipping processing, is formed by the specification data generation section 284 (such as data that would be 10000000 in FIG. 7A) and is output to the initial-value setting section 152. The initial-value setting section 152 sets an initial value for the processing of this 3D object 50 in the initial-value setting section 152, based on this specification data. As a result, data for polygons 52 to 58 is subjected to only perspective projection conversion in the clipping calculation section 200 and is output therefrom.

In a similar manner, the 3D object 30 is determined by an inside/outside decision to be in the out-of-display region 28, and it is determined that it is not necessary to perform clipping processing on the polygons 32 to 38. Therefore, in this case, specification data for which neither perspective projection conversion not clipping processing is performed is formed in the specification data generation section 284 (such as data that would be 00000000 in FIG. 7A) and is output to the initial-value setting section 152. An initial value for the processing of this 3D object 30 is set in the priority register 170 in accordance with this specification data. As a result, data for polygons 32 to 38 is not subjected to any processing in the clipping calculation section 200.

In a further similar manner, the 3D object 40 is determined by an inside/outside decision to be in the boundary region 27, and it is determined that clipping processing is necessary for polygons 42 to 48. In this case, the specification data is not formed by the specification data generation section 284. Therefore, clipping processing for the polygons 42 to 48 can be performed efficiently by the above described method of sequentially modifying the priority.

By combining the method of sequentially modifying the priority and the method of performing trivial clipping processing, as described above, this embodiment enables the execution of extremely efficient clipping processing. In other words, since only perspective projection conversion is needed for polygons that have been determined to be in the display region 26 by the preprocessing section 280, the processing is completed in only one time unit. Since there is no need for processing polygons that are in the out-of-display region 28, the processing time therefor is the time necessary for preprocessing. For polygons that are in the boundary region 27, processing can be performed in one or two time units for most of the polygons, except for the polygon that is processed first, by the above method of sequentially modifying the priority.

4. Specific Examples

1) Priority Modification Section, Priority Register, etc.

Figure 11:
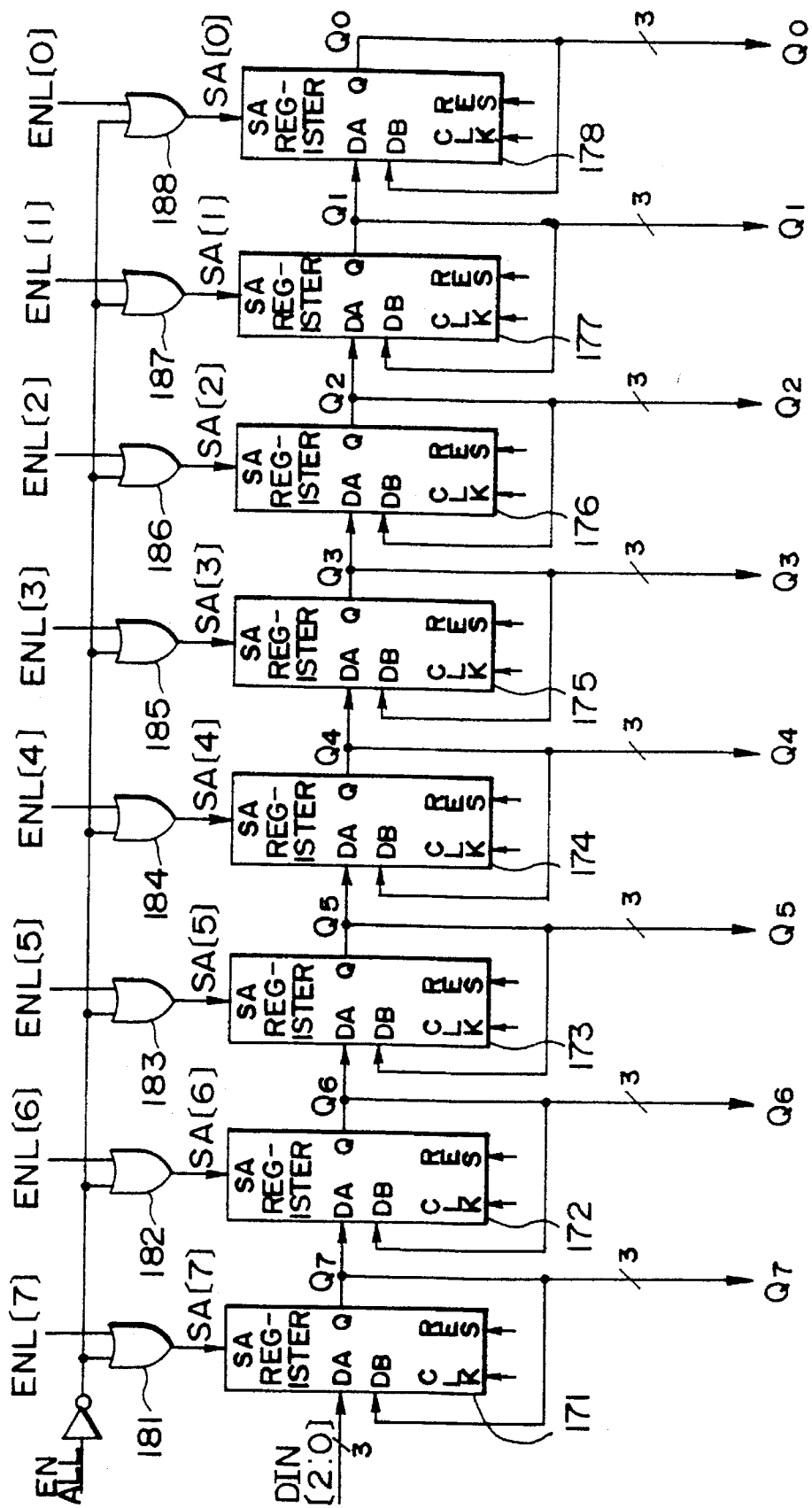
FIG. 11 is a block diagram of a schematic circuit configuration of the priority register (priority memory means)
Figure 12:
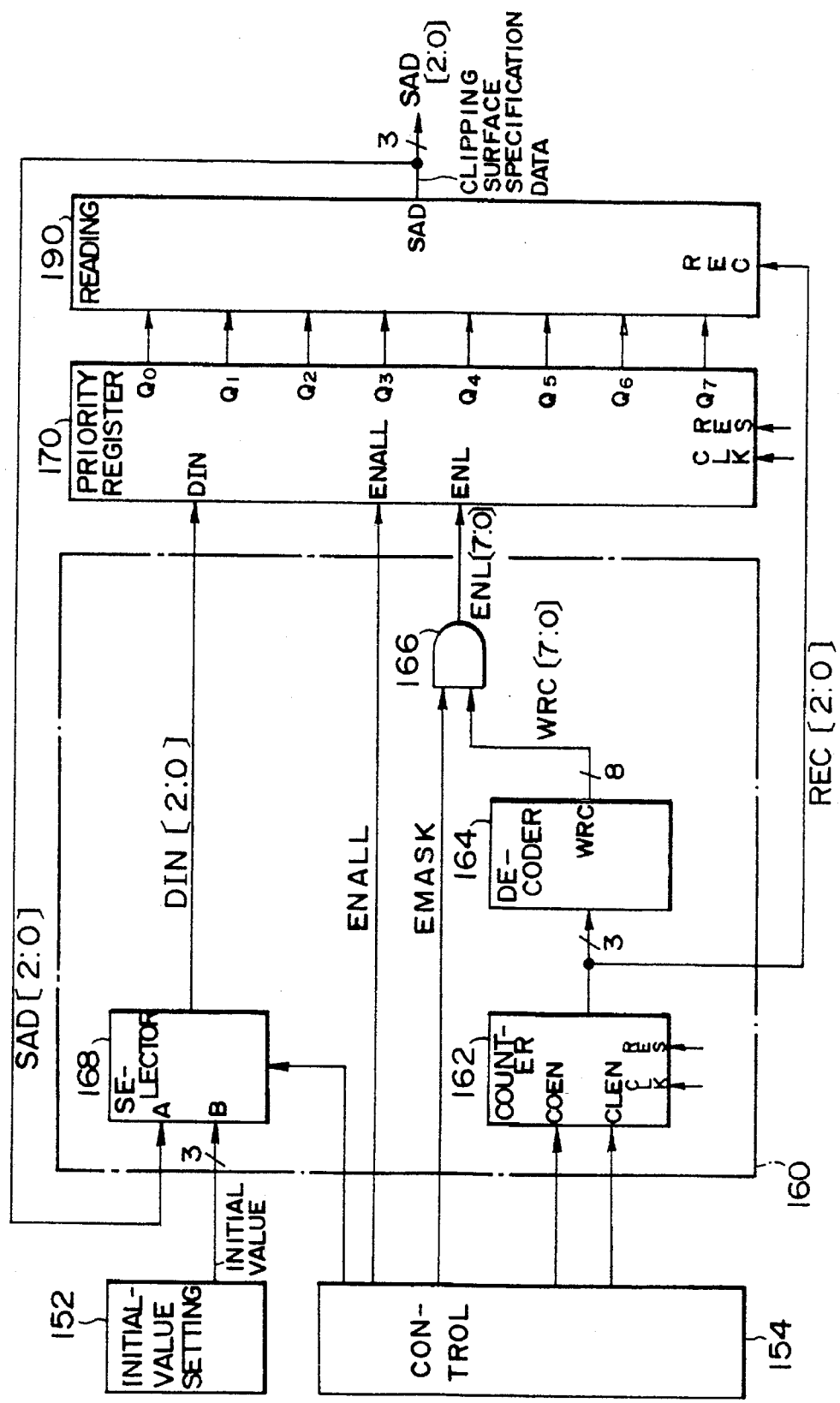
FIG. 12 is a block diagram of a schematic circuit configuration of the priority modification section.

A specific circuit configuration for the priority register 170 is shown in FIG. 11 and a specific circuit configuration of the priority modification section 160 is shown in FIG. 12, together with details of the connection states between blocks.

As shown in FIG. 11, the priority register 170 comprises eight 3-bit registers 171 to 178 that store clipping surface priorities and OR circuits 181 to 188 for enabling data write to these registers.

As shown in this figure, the registers 171 to 178 are connected in series, are driven by a CLK signal, and are reset at power-on by a RES signal. Input data DIN[2:0] is input to the head register 171.

If any of select signals SA[7:0] that are input to SA pins of the registers is then asserted, a DA pin thereof is selected as input data to the corresponding register. This causes the output data from the previous-stage register to be loaded into the selected register, and the data shifts. If, on the other hand, the select signal SA[7:0] that is input to the SA pin is negated, a DB pin thereof is selected as input data of that register. This causes the output data to be fed back unchanged as input to the same register, so that the previous data is held unchanged in that register.

Note that, in this case, "assert" refers to a signal state such that a pin turns on, and "negate" refers to a signal state such that the pin turns off.

An enable signal ENALL that is input from the control section 154 and load signals ENL[7:0] that are input from the priority modification section 160 are connected to the OR circuits 181 to 188. If the enable signal ENALL is asserted, input of the load signals ENL[7:0] is inhibited and all of the registers 171 to 178 are put in a shift state. Conversely, if the enable signal ENALL is negated, input of the load signals ENL[7:0] is enabled.

The priority modification section 160 comprises a counter 162, a decoder 164, an AND circuit 166, and a selector 168 as shown in FIG. 12.

The counter 162 is a 3-bit synchronous counter, it is driven by the CLK signal, and it is reset at power-on by the RES signal. If a count enable signal COEN is asserted, the counter is incremented at the next CLK signal. If a clear enable signal CLEN is asserted, the counter is cleared in synchronization with the next CLK signal.

This counter 162 stores data indicating the number of the round of clipping processing, when the device is in the above described re-entrant mode. The description below takes as an example the clipping processing device 420a performing the third round of clipping processing, with the connection state shown in FIG. 6C. In other words, if polygon data that is to be processed is in a newly input state and the data stored in the counter 162 is 000, the first round of clipping processing is performed on the polygon data in this state. When the first round of clipping processing ends, count enable signal COEN that is input from the control section 154 is asserted, and the data stored in the counter 162 becomes 001. In a similar manner, when the second round of clipping processing ends, the stored data becomes 010, and the third round of clipping processing is performed with this state. Finally, when the third round of processing ends, the clear enable signal CLEN is asserted and the stored data is once again cleared to 000.

The counter 162 fulfills two functions with the above described operation, as described below. The first function is to specify the clipping surface that is to perform the current clipping processing (or perspective projection conversion mode). In other words, the output of the counter 162 is input to the reading section 190 as a 3-bit read code REC[2:0]. The reading section 190 uses this read code REC[2:0] to select one of the outputs Q0 to Q7 of the priority register 170 to become clipping surface specification data SAD[2:0]. This causes index data specifying the clipping surface that is to perform the current clipping processing (or perspective projection conversion mode) to be output to the subsequent-stage clipping calculation section 200.

The second function of the counter 162 is to generate a signal for writing to the priority register 170 when clip-out occurs. To be specific, the output of the counter 162 is input to the decoder 164, as shown in FIG. 12. The decoder 164 generates an 8-bit write code WRC[7:0] shown in FIG. 13A from the 3-bit data input from the counter 162. This write code WRC[7:0] is input as a load signal ENL[7:0] to the priority register 170 through the AND circuit 166. The priority register determines from this load signal ENL[7:0] which of the registers is to be written to.

The selector 168 has the function of selecting either the initial value that is input from the initial-value setting section 152 or the clipping surface specification data SAD [2:0] (to be specific, data specifying the clipping surface that initiated clipping-out) that was output from the read-out section 190.

The operation of this circuitry will now be described with reference to FIGS. 13B to 13D.

A) Initialization

In an initial state, in other words, at power-on or at the start of processing of each 3D object, initial mode specification data (at power-on) or priority specification data (at the start of 3D object processing) is input to the initial-value setting section 152. At this point, assume that data 10101110 shown in FIG. 13B has been input to the initial-value setting section 152. This means that clipping processing is to be performed with clipping surfaces 1, 2, 3, and 5, then perspective projection conversion (7) is to be performed and output. The initial-value setting section 152 encodes this data as a 3-bit value and outputs it to the selector 168. To be specific, values 111, 101, 011, 010, and 001, in other words, 3-bit codes indicating 7, 5, 3, 2, and 1, are encoded.

A pin B of the selector 168 is selected by a control signal from the control section 154, and the encoded data is input thereto. In this case, the signal that enables all of the signals from the control section 154 is set to ENALL=0. Therefore, as described above, all of the registers 171 to 178 within the priority register 170 are put into a shift state. As a result, the data from the selector 168 is sequentially input to the registers 171 to 178. In this example, 1 is set in the register 171, 2 is set in the register 172, 3 is set in the register 173, 5 is set in the register 174, and 7 is set in the register 175, while registers 176 to 178 are in an undefined state.

B) During Normal Operation

After the above described initialization has ended, clipping processing starts. During normal operation, ENMASK is set to 0 and ENALL to 1. This sets a state in which all the write codes WRC[7:0] are masked and all the load signals ENL[7:0] are 0, so that all of the select signals SA[7:0] are 0. As a result, all of the registers 171 to 178 are in a hold state and the above data 12357 is held unchanged.

The read code REC[2:0] that is the output from the counter 162 is then sequentially incremented. This leads to the outputs Q7 to Q1 of the priority register 170 being sequentially selected by the reading section 190 and, as a result, the clipping processing is performed in the sequence of clipping surfaces 1, 2, 3, then 5 for this example, and finally perspective projection conversion (7) is performed.

C) If Clip-Out Occurs

Assume that a certain polygon is clipped out by clipping surface 3, for example, during normal operation. When that happens, EMASK is set to 1 by the control section 154, the AND circuit 166 is made conductive, and the load signals ENL[7:0] as far as the clipping surface for which the current clipping processing is being performed are asserted. To be specific, ENL[7] to ENL[5] in FIG. 13C become 1. As a result, the registers 171 to 173 are put in a shift state and the registers 174 to 178 are put in a hold state.

A pin A of the selector 168 is selected so that the register 173 that is storing specification data for the clipping surface 3 is connected through the selector 168 to the first-stage register 171, as shown in FIG. 13C.

Since the registers 171 to 173 are shifted at the next clock signal, the sequence of data stored in the registers 171 to 173 is changed from 1, 2, then 3 to 3, 1, then 2, as shown in FIG. 13D. In other words, the data specifying the clipping surface for which the current clipping processing is being performed is loaded in the first-stage register and the specification data of which sequence is shifted one step down is loaded from the second-stage register until the register for the current clipping processing.

Note that, since the perspective projection conversion processing must always be performed after all of the clipping processing has ended, EMASK is 0 and the contents of the priority register 170 are not modified during the perspective projection conversion processing.

If, for example, a certain polygon is clipped out by the clipping surface 3, the above operation enables the implementation of a huge increase in the speed of clipping processing by starting the processing of the next polygon from that clipping surface 3. In this case, the sequence of clipping surfaces is moved one step downward. This means that a clipping surface that caused a previous clip-out is moved downward to the second position. Since it is highly likely that clipping-out will occur with the clipping surface at the next position, even if the clipping-out does not occur with the uppermost clipping surface, it is possible to implement faster, optimized clipping processing.

2. Clipping Calculation Section

The configuration and the operation of the clipping calculation section 200 will now be described.

The clipping processing method of this embodiment will first be described with reference to FIG. 14. This figure shows the clipping of a polygon 70 by a clipping surface 1. In this figure, V0=(X0, Y0, Z0), V1=(X1, Y1, Z1), V2=(X2, Y2, Z2), and V3=(X3, Y3, Z3) are vertex coordinates of the polygon 70 and h(V)=aX+bY+cZ+d is the plane equation of the clipping surface 1.

A) Inside/Outside Decision for Each Set of Vertex Coordinates

Simultaneously with the input of polygon data, an inside/outside decision is executed to determine whether vertex coordinates V0 to V3 are in a region outside the clipping surface 1 or in a region within that surface. For this purpose, the following calculations are first performed:

$$h(V0)=aX0+bY0+cZ0+d$$

$$h(V1)=aX1+bY1+cZ1+d$$

$$h(V2)=aX2+bY2+cZ2+d$$

$$h(V3)=aX3+bY3+cZ3+d$$

According to the above calculations, Vn is determined to be in the display region if h(Vn) is less than or equal to zero, or Vn is determined to be in the out-of-display region if h(Vn) is greater than zero. In the example shown in FIG. 14, since h(V0) and h(V3) are both greater than 0, it is determined that V0 and V3 are in the out-of-display region, whereas, since h(V1) and h(V2) are less than or equal to 0, it is determined that V1 and V2 are in the display region.

B) Interior-Division-Point Calculation

Figure 14:
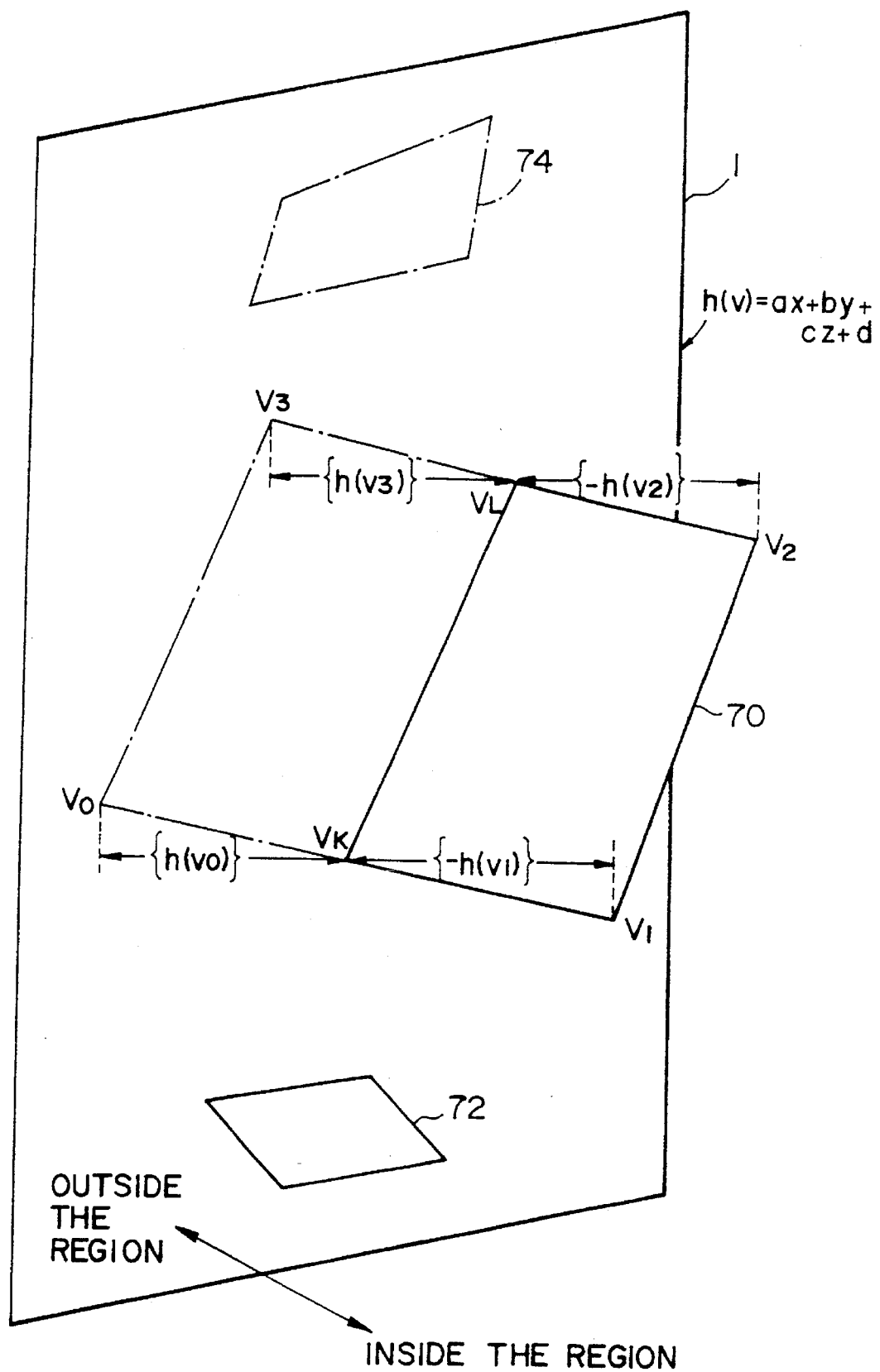
FIG. 14 is a schematic diagram for illustrating the clipping calculation method of the clipping calculation section.

For a polygon 72 in FIG. 14 for which it has been determined that all vertices are in the display region, the configuration is such that all vertices are supplied as is to the next process (such as clipping processing and/or perspective projection conversion for the next plane). For a polygon 74 for which it has been determined that all vertices are in the out-of-display region, all vertices are excluded from the next process.

In contrast thereto, clipping points, in other words, interior division points(divided points) Vk and Vl, are obtained for the polygon 70 that has been clipped by the clipping surface 1. Vertices V0 and V3 are excluded from the subsequent processing, and interior division points Vk and Vl are made vertices of the polygon 70 instead and these are used in the subsequent processing.

To obtain the interior division points Vk and Vl, interior division ratios tk and tl are obtained from the following equations:

$$tk=(|h(V0)|)/(|h(V1)-h(V0)|)$$

$$tl=(|h(V2)|)/(|h(V3)-h(V2)|)$$

These interior division ratios tk and tl are then used to obtain the interior division points Vk and Vl from the following equations:

$$Vk=V0+tk(V1-V0)$$

$$Vl=V2+tl(V3-V2)$$

The above interior-division-point calculations were all described with reference to an example of calculating the interior division points for vertex coordinates, but interior division points for vertex texture coordinates or vertex brightness information could also be obtained by clipping with this embodiment. Concerning the number of vertices of the polygons, the above description used an example of polygons with four vertices, but this embodiment is not limited thereto and it can be applied to clipping processing for polygons having any number n of vertices. In such a case, the above equations can thus be expressed by the following general equation to obtain output data Wout:

$$Wout=Wa+ti(Wb-Wa)$$

W: Clipping for any one of vertex brightness coordinates I0 to In; vertex texture coordinates TX0, TY0 to TXn, TYn; or vertex coordinates X0, Y0, Z0 to Xn, Yn, Zn a, b: Point numbers between two points that are to be clipped ti: The interior division ratio at that point Note that the calculation for data that is supplied unchanged to the next process, without being subjected to clipping processing, is performed with ti=0 in the above equation.

Note also that the clipping processing device performs the inside/outside decision and the interior-division-point calculation by pipeline processing to increase in speed.

C. Configuration and Operation of Clipping Calculation Section

Figure 15B:
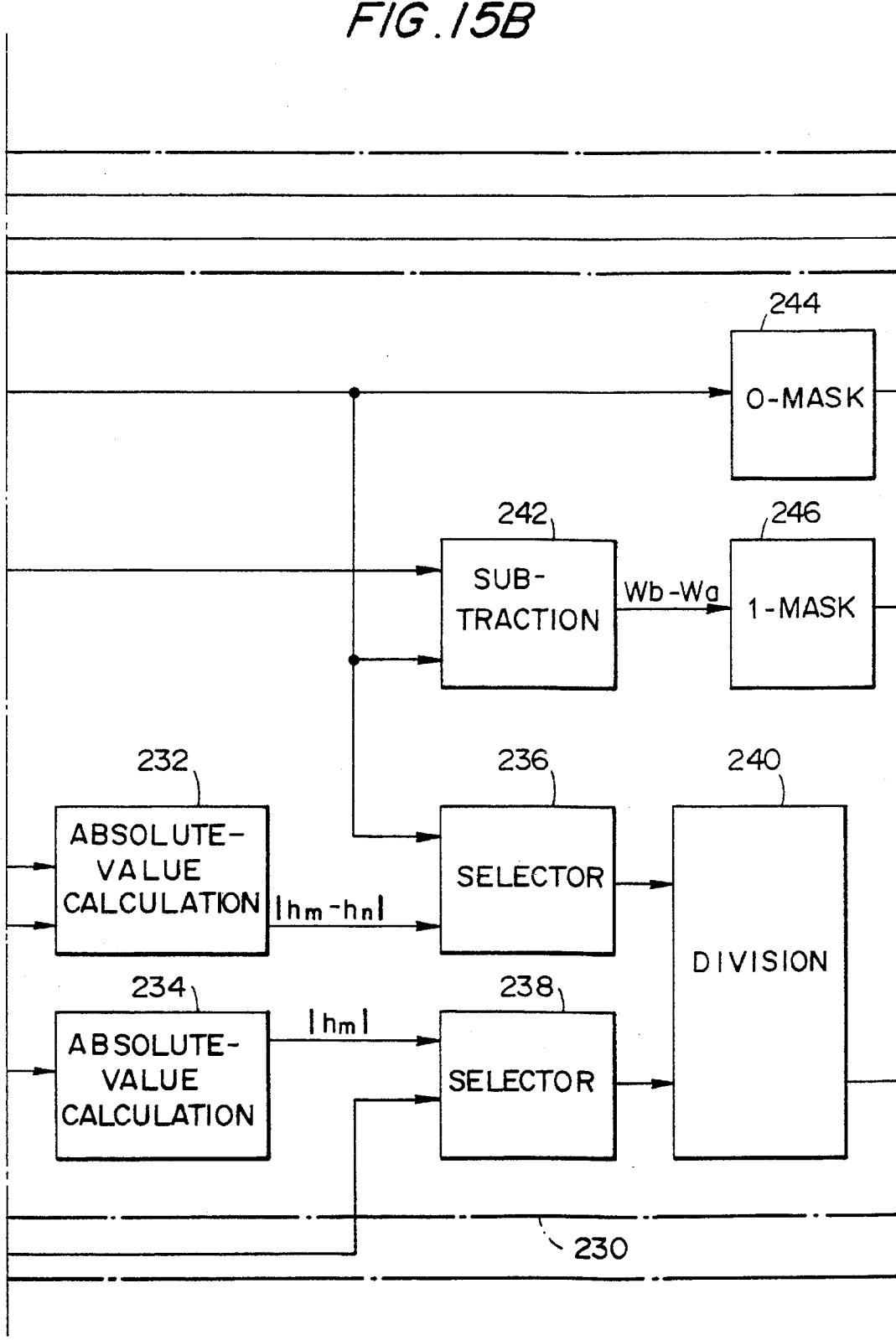
Figure 15C:
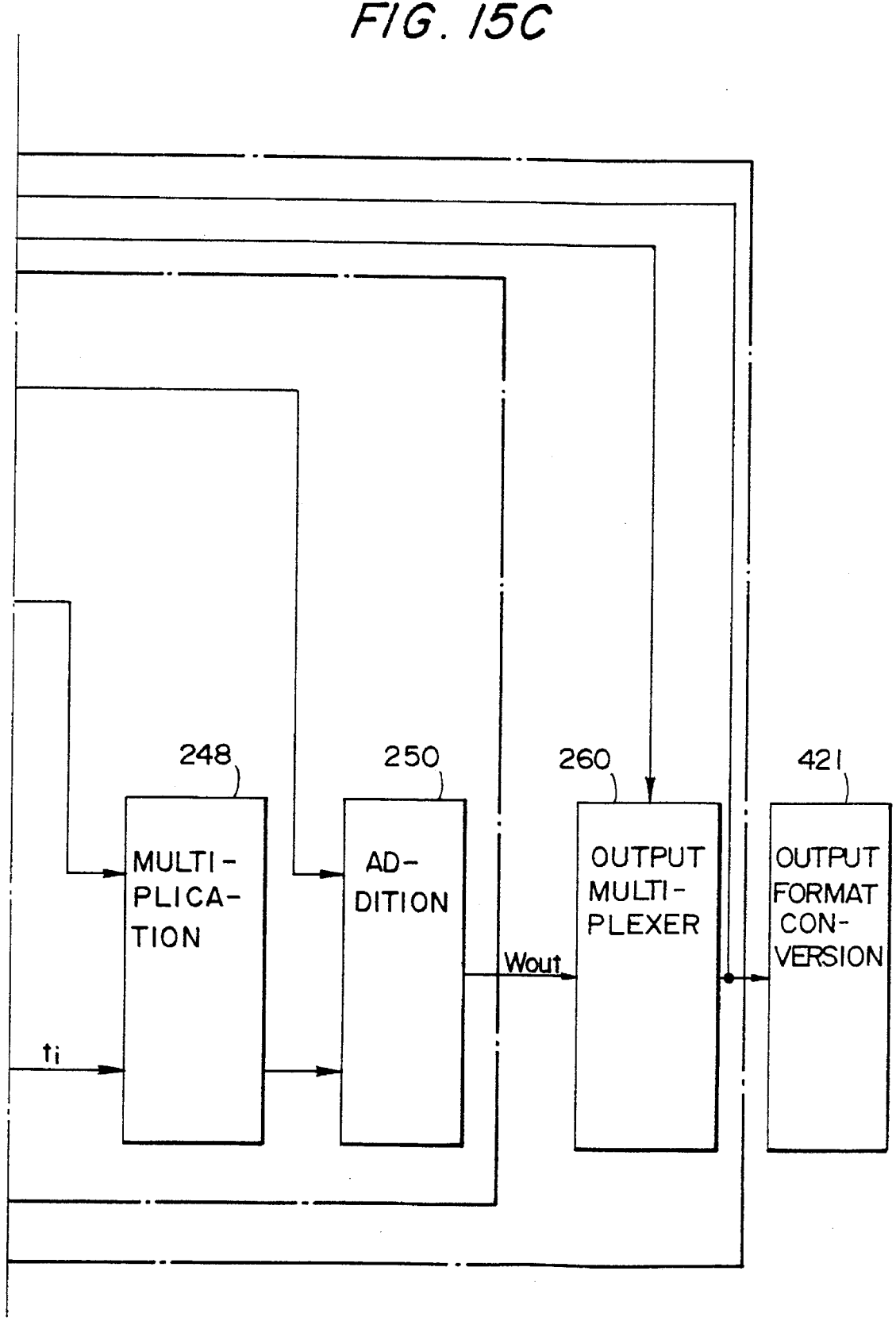

The clipping calculation section 200 is configured to comprise an inside/outside decision section 210, an interior-division-point calculation section 230, and an output multiplexer 260, as shown in FIG. 15.

In this embodiment, the calculation processing of this inside/outside decision section 210 and that of the interior-division-point calculation section 230 are performed by pipeline processing. Inside/outside decision calculations are sequentially performed on the input polygon data by the inside/outside decision section 210, and the latest data that is to be subjected to the interior-division-point calculation is controlled in such a manner that it is output to the interior-division-point calculation section 230. This control method is used for the reasons given below. The number of polygons to be subjected to the interior-division-point calculation in this type of 3D simulator device is always changing with the player's control state. However, since divisions and other calculations are performed by the interior-division-point calculation section 230, this section requires more calculation processing time than the inside/outside decision section 210. Therefore, to perform the calculation processing at the optimum speed under such conditions, it is necessary to control the inside/outside decision section 210 in such a manner that the latest data can always be output to the interior-division-point calculation section 230.

The clipping processing device 420 according to this embodiment can perform clipping processing for a plurality of clipping surfaces with a single clipping processing device by using the previously mentioned re-entrant mode. In this case, clipping processing can be performed by a plurality of clipping surfaces for the same polygon by the output multiplexer 260 re-inputting polygon data for which clipping processing has ended to an input section 212

The inside/outside decision section 210 comprises the input section 212, a polygon data register 214, a plane equation calculation section 216, and a clipping specification section 218.

The data necessary for the clipping calculation section 200 is extracted by the input section 212 from the input frame data, object data, polygon data from the coordinate conversion section 418, and is subjected to various forms of data format conversion.

For example, details of the monitor that is to display the image, such as its angle and size, are extracted from the frame data, leading to the extraction of coefficients of the plane equations for performing the clipping. Data necessary for the processing of each object is also extracted from the object data. Further data, such as the vertex coordinates, vertex texture coordinates, and vertex brightness information of the polygons, is extracted from the polygon data, this is subjected to the necessary data format conversion, then the vertex coordinates are output to the plane equation calculation section 216 and the data such as the vertex coordinates, vertex texture coordinates, and vertex brightness information is output to the polygon data register 214.

The data input from the input section 212, such as vertex coordinates, vertex texture coordinates, and vertex brightness information, is sequentially stored in the polygon data register 214, then data is output to the interior-division-point calculation section 230 or the output multiplexer 260 in accordance with specifications from the clipping specification section 218.

An inside/outside decision is performed by the plane equation calculation section 216 for each of the vertex coordinates Vn of the polygons in accordance with the equation given below. The coefficients a, b, c, and d are set by the frame data. The decision as to which clipping surface plane equation is to be used for the calculations, in other words, which sequence of clipping surfaces is to be used for the calculations, is determined by data read from the reading section 190.

$$h(Vn)=aXn+bYn+cZn+d$$

According to the above calculation, Vn is determined to be in the display region if h(Vn) is less than or equal to zero, or Vn is determined to be in the out-of-display region if h(Vn) is greater than zero.

Index data for each polygon vertex of the display region or out-of-display region is stored by the clipping specification section 218. If it is determined that all the vertices of a polygon are in the out-of-display region, a specification that the polygon data is to be ignored is set in the polygon data register 214.

If it is determined that all the vertices are within the display region, a specification that that polygon data is to be output to the output multiplexer is set in the polygon data register 214.

If it is determined that the polygon is in the boundary region of a clipping surface, in other words, if it is determined that the polygon is divided by the clipping surface, a specification that the polygon data is to output to the interior-division-point calculation section 230 is set in the polygon data register 214. In this case, h(Vm) and h(Vn) (hereinafter called hm and hn) that were calculated by the plane equation calculation section 216 are output to the interior-division-point calculation section 230.

Note that other necessary data, such as control data within the interior-division-point calculation section 230, is also generated by the clipping specification section 218. If the current mode is one in which perspective projection conversion is performed, various specifications are given such that the calculations by the interior-division-point calculation section 230 become perspective projection conversion calculations.

The interior-division-point calculation section 230 comprises absolute-value calculation sections 232 and 234, a division section 240, a subtraction section 242, a 0-mask section 244, a 1-mask section 246, a multiplication section 248, and an addition section 250.

The values of both |hm−hn| and |hm| are calculated by the absolute-value calculation sections 232 and 234 from hm and hn output from the clipping specification section 218, then these values are output to the division section 240. The interior division ratio ti=|hm|/|hm−hn| is calculated from this data by the division section 240 and it is output to the multiplication section 248.

The value of (Wb−Wa) is calculated by the subtraction section 242 from the polygon data Wa and Wb that is input from the polygon data register 214 and it is output to the multiplication section 248. Note that these data items Wa and Wb are not just polygon vertex coordinates; they also include vertex texture coordinates and vertex brightness information. This is because this data will be necessary for the subsequent image processing when the polygon is divided.

The value of ti(Wb−Wa) is then calculated from these values of ti and (Wb−Wa) by the multiplication section 248 and it is output to the addition section 250.

The following value is calculated by the addition section 250 from these values of Wa and ti(Wb−Wa):

$$Wout=Wa+ti(Wb-Wa)$$

Thus the interior division points are obtained.

Note that the calculations by the interior-division-point calculation section 230 are not limited to interior-division-point calculations; perspective projection conversion calculation can also be performed. In such a case, Wa and h are selected by selectors 236 and 238, respectively, and each data item is set to either 0 or 1 by masking the corresponding data by the 0-mask section 244 and the 1-mask section 246. This sets Wa=0, Wb−Wa=1, and ti=h/Wa in the above equation to calculate:

$$Wout=h/Wa$$

and thus the perspective projection conversion is performed. In this manner, perspective projection conversion can also be performed by this embodiment by making use of the circuit configuration for interior-division-point calculations. Therefore it is not necessary to provide a new circuit for performing perspective projection conversion, which can greatly reduce the hardware. This has the particular advantage of enabling common use of large circuits such as the division section 240.

The calculation result Wout of the interior-division-point calculation section 230 is input to the output multiplexer 260. If there is still some clipping processing to be performed on that polygon with other clipping surfaces, the calculation result returns to the input section. This operation repeats until the processing for all the clipping surfaces stored in the priority register and the perspective projection conversion has ended. When the processing for the final clipping surface or the perspective projection conversion ends, data is output to the next-stage output format conversion section 421.

Figure 16A:
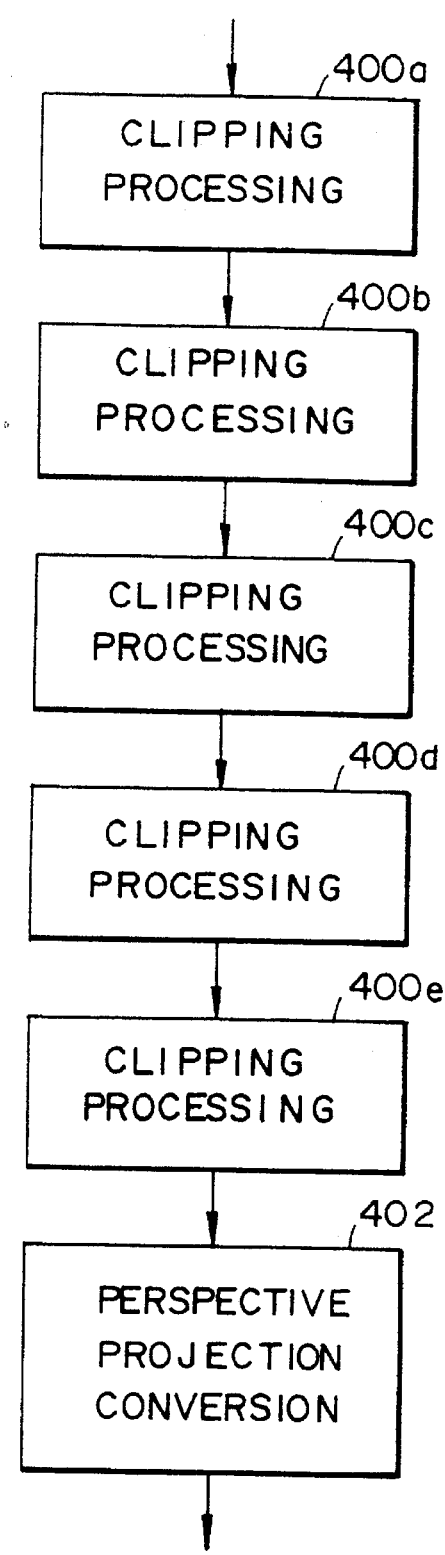
FIGS. 16A, 16B, 16C, and 16D are schematic diagrams for illustrating increases in processing speed by the application of priority modification and parallel connection.

3. Increase in Processing Speed by Priority Modification and Parallel Connection Clipping processing performed by a prior-art clipping processing device is shown in FIG. 16A. In this prior art, five clipping processing devices 400a to 400e and a perspective projection conversion circuit 402 are connected in series to perform clipping processing (for clipping by five surfaces). Assume in the description below that the processing time in this case is one time unit.

Figure 16B:
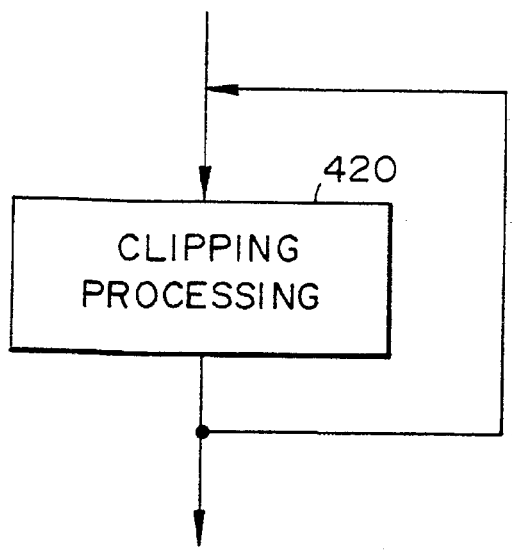
Figure 16C:
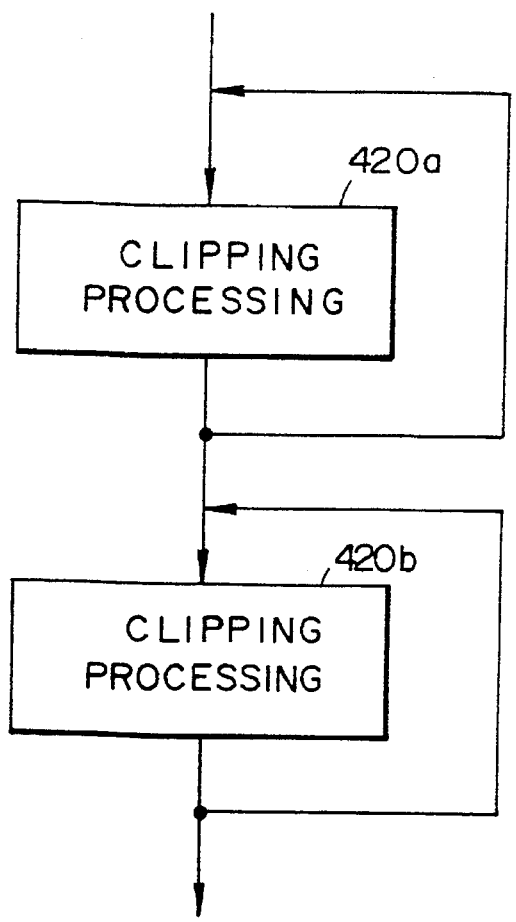

In contrast, the clipping processing device in accordance with this embodiment can execute the processing with a single clipping processing device, as shown in FIG. 16B. Depending on the state of the image to be processed, the processing could be performed by a plurality of clipping processing devices, such as two clipping processing devices 420a and 420b, as shown in FIG. 16C. The description below concerns how the clipping processing device according to this embodiment can be effective from the speed point of view.

Figure 16D:
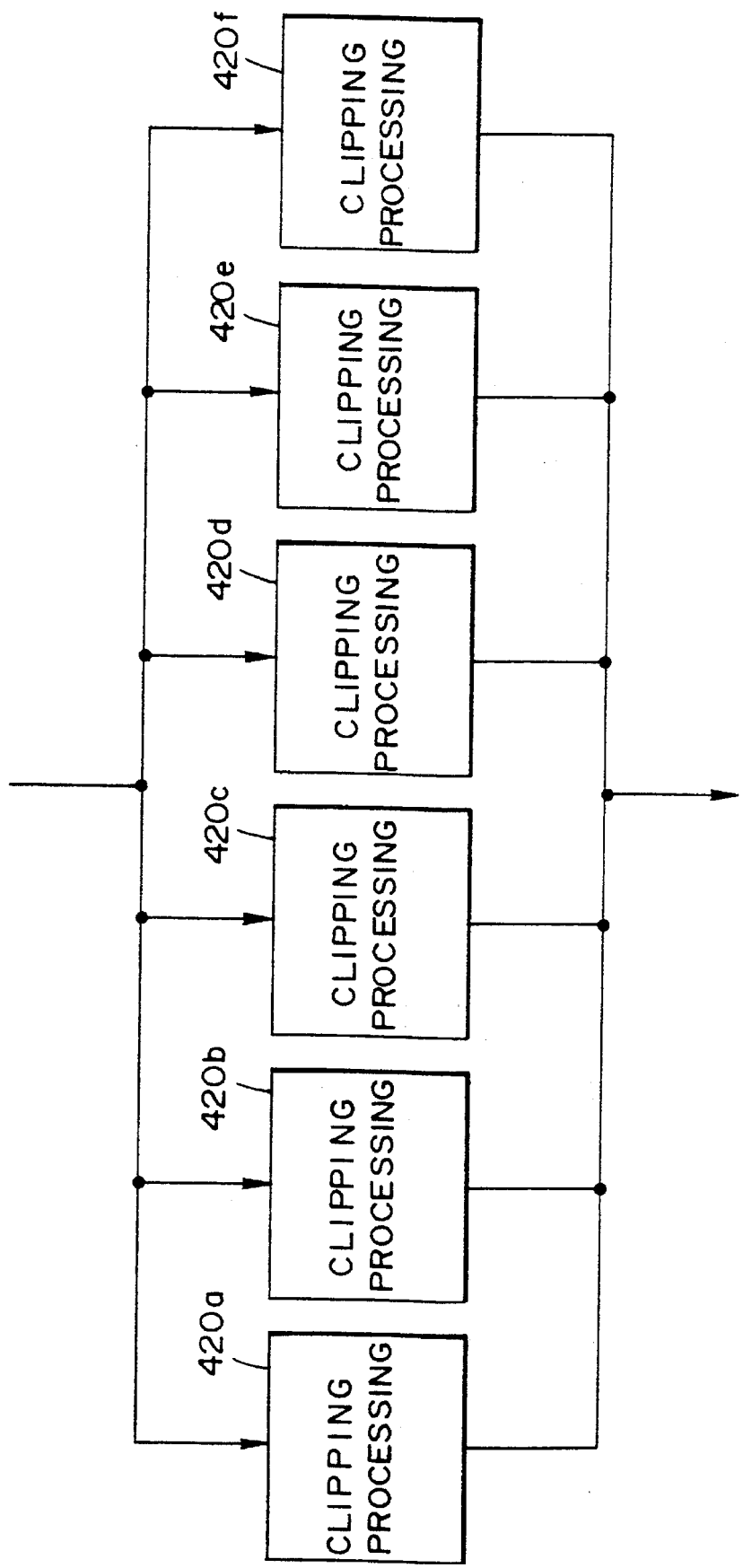
Figure 17:
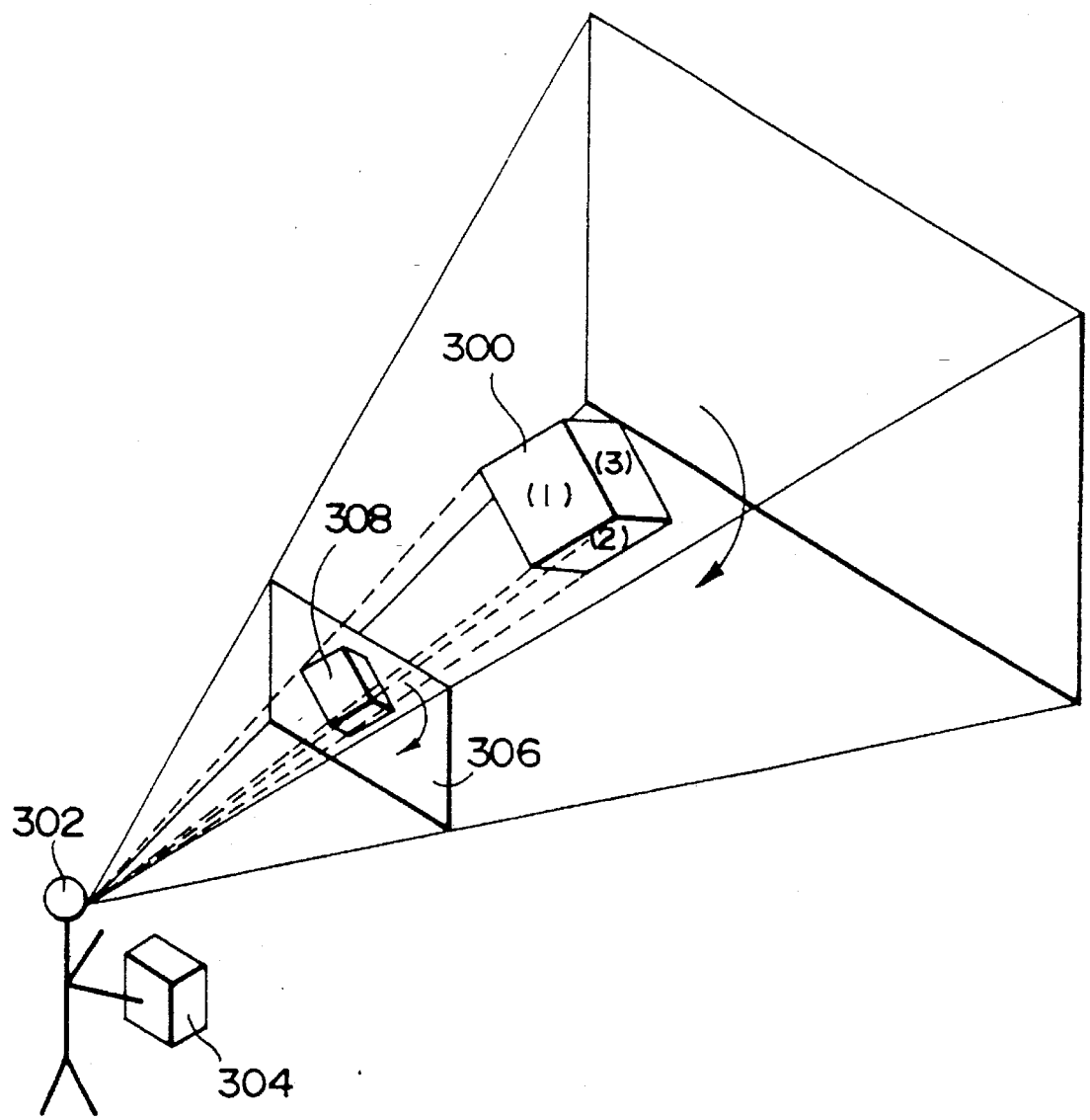
FIG. 17 is a schematic diagram for illustrating the concept of a prior-art 3D simulator device.
Figure 18:
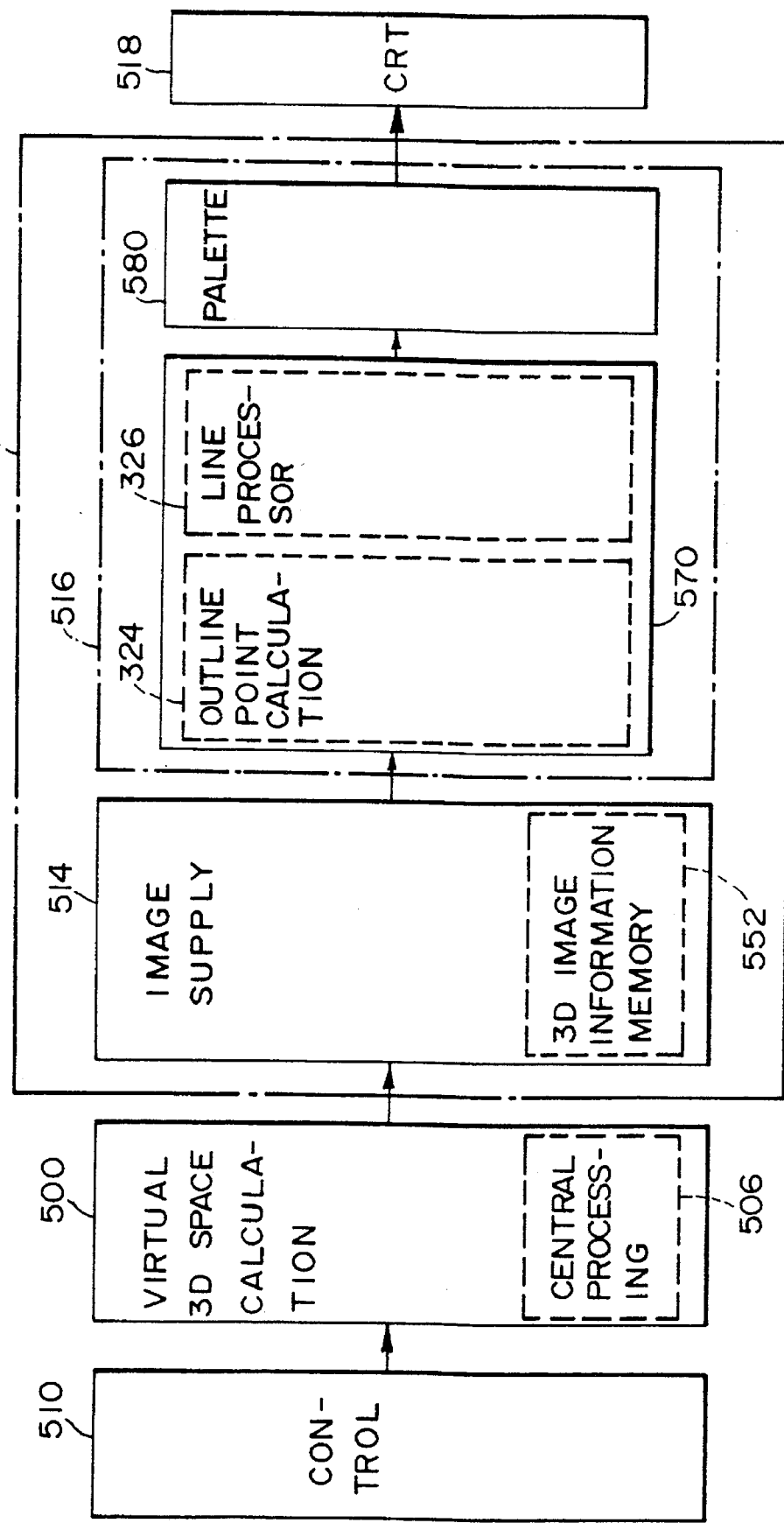
FIG. 18 is a schematic block diagram of the configuration of the prior-art 3D simulator device.

With the clipping processing device according to this embodiment, the configuration could be such that six clipping processing devices 420a to 420f are connected in parallel, as shown in FIG. 16D, to provide parallel processing of polygon data. With this type of connection, processing can still be performed by the same number of clipping processing devices as that required for the prior-art clipping processing of FIG. 16A.

With the configuration of FIG. 16D, if it is determined by using the trivial acceptance/rejection method that clipping is not necessary for all of the polygons and only perspective projection conversion is necessary, for example, clipping processing can be performed at a speed that is six times that of the prior art. Even if this ideal state does not occur, this connection configuration is still extremely effective for increasing processing speed, as will be described below.

For example, if the 3D simulator device of this invention is applied to a game, this does not mean that the clipping processing of polygons within the game must be applied for all of the polygons and by all of the clipping surfaces. Variations due to the state of the images could produce the following ratios:

Clipping processing is not necessary: 70%
Clipping processing by one surface is necessary: 20%
Clipping processing by two surfaces is necessary: 8%
Clipping processing by three or more surfaces is necessary: 2%

Rough estimates of the time require for clipping processing in this case are given below. In other words, if the above ratios of time taken are rated from P0 (clipping processing is not necessary, only perspective projection conversion is performed) to P5 (clipping processing by five surfaces is necessary, including perspective projection conversion), the time taken by clipping processing can be expressed as:

$$1 \times P0 + 2 \times P1 + 3 \times P2 + 6 \times P5 \tag{k}$$

Note that, in order to simplify the description, clipping with three or more surfaces is totalled as clipping by five surfaces.

If the above typical ratios are substituted, Equation (k) becomes:

$$1 \times 0.7 + 2 \times 0.2 + 0.08 + 6 \times 0.02 = 1.46$$

If this is divided between six clipping processing devices connected in parallel:

$$1.46/6 = 0.233$$

Since one time unit is required by the prior-art clipping processing device of FIG. 16A, the processing speed becomes approximately 4.1 times that speed.

The point should be noted that the number of clipping processing devices has not changed in comparison with FIG. 16A. Enabling of this speed depends on dynamic changes in the details of polygon clipping processing. But, in the worst case in which clipping is necessary for all of the polygons, this difference in speed completely disappears in comparison with the configuration of FIG. 16A.

However, even in such a case, a drop in processing speed can be prevented by the use of the previously described function that modifies priorities internally. This is described below.

Consider a case in which clipping processing is necessary for all polygons, using three surfaces. This could occur for one 3D object formed of a plurality of polygons. Up until the present it has been necessary to perform the processing for this case in four loops (including perspective projection conversion), but the processing speed is only increased by 6/4=1.5 times in comparison with the configuration of FIG. 16A. However, it is considered that 95% of the processed polygons are clipped out by one surface in practice. This occurs frequently when clipping processing is actually performed. Assume as a condition that the first polygon not to be clipped out is aligned and the clipped-out polygon is aligned subsequently.

In this case, a time of four times is necessary for the clipped-out first polygon. However, use of the previously described priority-modification method ensures that the next polygon is processed first of all by the clipping surface that caused that clipping-out, so that only one time unit is necessary. Assuming that the number of polygons is sufficiently large, the processing time in this case is given by:

$$0.05 \times 4 + 0.95 \times 1 = 1.15$$

In comparison with the case in which the priorities of clipping surfaces are not changed, this gives:

$$4/1.15 = 3.4 \text{ (times)}$$

And in comparison with the configuration of FIG. 16A:

$$1.5 \times 3.4 = 5.1 \text{ (times)}$$

Thus a value that is pretty close to the ideal state (6 times) is obtained.

In other words, even when conventional processing would by delayed, use of this clipping surface priority modification function makes it possible to substantially avoid such delays.

Note that the present invention is not limited to the above described embodiments; it can be embodied in many different ways within the scope of the invention.

For example, the calculation method used for the clipping processing performed by the clipping calculation section in accordance with this invention is not limited to the above described calculation method; calculation methods using various different types of algorithm could be used instead.

Further, the priority memory means of this invention is not limited to registers configured of flip-flops or the like; any memory means such as SRAM or DRAM could be used, provided that at least priorities (index data) can be stored thereby.

The 3D simulator device of this invention can be applied to various different purposes, such as an arcade games machine, a family computer(domestic) games machine, a flight simulator, or a driving simulator as used in a driving school. It can also be applied to a large-scale attraction type of game device or simulator in which a number of players participate.

The calculation processing performed by components such as the virtual 3D space calculation means, image synthesis means; and clipping processing device that have been described above with respect to this invention could be performed by a dedicated (custom made) image processing device, or it could be performed by software means such as in a general-purpose (standard type) microprocessor or DSP.

Furthermore, the calculation processing performed by the virtual 3D space calculation means and image synthesis means is not limited to the calculations described with respect to this embodiment.

In addition, the 3D simulator device to which this invention is applied includes a configuration in which the image is displayed on a display means known as a head-mounted display (HMD).

What is claimed is:
1. A clipping processing device for performing clipping processing using a plurality of clipping surfaces on a three-dimensional object represented by a plurality of polygons, comprising:

a priority memory means for storing clipping surface priorities which has a storage means for storing index data specifying said clipping surfaces to be used in clipping processing and stores said index data in a sequence in which clipping processing is executed, starting at an uppermost storage location of said storage means and proceeding downward;

an initial-value setting means for setting an initial value for said index data with respect to said priority memory means;

a reading means for reading said index data of said clipping surface from said priority memory means;

a priority modification means for modifying said index data that has been read by said reading means and rewriting modified data to said priority memory means; and a clipping calculation means for performing clipping calculation with respect to a polygon to be processed, using said clipping surfaces specified by said index data read out by said reading means in sequence from the uppermost storage location of said storage means; wherein:

said clipping calculation means comprises inside/outside decision means for determining whether said polygon to be processed is in one of a display region, a boundary region, or an out-of-display region of said clipping surfaces; an interior-division-point calculation means for calculating interior division points between said polygon and said clipping surface when said inside/outside decision means determines that said polygon is in said boundary region; and means for performing calculation processing that invalidates said polygon when said inside/outside decision means determines that said polygon is in said out-of-display region; and said priority modification means comprises means for transferring index data of said clipping surface to the uppermost storage location of said storage means when said clipping calculation means determines that said polygon to be processed is in the out-of-display region of said clipping surface.

2. The clipping processing device as defined in claim 1, wherein:

said priority modification means comprises means for transferring index data of said clipping surface to the uppermost storage location of said storage means, and also transferring index data that have been stored in starting from said uppermost storage location and ending one position higher than an original location of said index data to be transferred to the uppermost storage location sequentially downwards to lower storage locations, when said clipping calculation means determines that said polygon to be processed is in said out-of-display region of said clipping surface.

3. The clipping processing device as defined in claim 2, further comprising:

means for performing preprocessing for the entirety of a three-dimensional object, before clipping processing is performed on a polygon that configures said three-dimensional object;

wherein said preprocessing means comprises:

preprocessing decision means for setting a zone for trivial clipping of a given width shaped in such as manner as to include said clipping surface, and determining whether said three-dimensional object is in any of a display region, a boundary region, or an out-of-display region of said zone; and means for omitting clipping processing for a polygon that configures the three-dimensional object when said preprocessing decision means determines that said three-dimensional object is in said display region or out-of-display region of said zone, and for specifying that clipping processing is performed for a polygon that configures the three-dimensional object when it is determined that said three-dimensional object is in said boundary region of said zone.

4. The clipping processing device as defined in claim 3, wherein:

said interior-division-point calculation means within said clipping calculation means comprises means for performing perspective projection conversion with respect to a polygon to be processed, by modifying calculation coefficients that are used in interior-division-point calculation.

5. The clipping processing device as defined in claim 4, further comprising:

means for setting said initial value set by said initial-value setting means for each three-dimensional object configured of polygons, in accordance with a display state of said three-dimensional object.

6. The clipping processing device as defined in claim 3, further comprising:

means for setting said initial value set by said initial-value setting means for each three-dimensional object configured of polygons, in accordance with a display state of said three-dimensional object.

7. The clipping processing device as defined in claim 2, wherein:

said interior-division-point calculation means within said clipping calculation means comprises means for performing perspective projection conversion with respect to a polygon to be processed, by modifying calculation coefficients that are used in interior-division-point calculation.

8. The clipping processing device as defined in claim 7, further comprising:

means for setting said initial value set by said initial-value setting means for each three-dimensional object configured of polygons, in accordance with a display state of said three-dimensional object.

9. The clipping processing device as defined in claim 2, further comprising:

means for setting said initial value set by said initial-value setting means for each three-dimensional object configured of polygons, in accordance with a display state of said three-dimensional object.

10. The clipping processing device as defined in claim 1, further comprising:

means for performing preprocessing for the entirety of a three-dimensional object, before clipping processing is performed on a polygon that configures said three-dimensional object;

wherein said preprocessing means comprises:

preprocessing decision means for setting a zone for trivial clipping of a given width shaped in such as manner as to include said clipping surface, and determining whether said three-dimensional object is in any of a display region, a boundary region, or an out-of-display region of said zone; and means for omitting clipping processing for a polygon that configures the three-dimensional object when said preprocessing decision means determines that said three-dimensional object is in said display region or out-of-display region of said zone, and for specifying that clipping processing performed for a polygon that configures the three-dimensional object when it is determined that said three-dimensional object is in said boundary region of said zone.

11. The clipping processing device as defined in claim 10, wherein:

said interior-division-point calculation means within said clipping calculation means comprises means for performing perspective projection conversion with respect to a polygon to be processed, by modifying calculation coefficients that are used in interior-division-point calculation.

12. The clipping processing device as defined in claim 11, further comprising:

means for setting said initial value set by said initial-value setting means for each three-dimensional object configured of polygons, in accordance with a display state of said three-dimensional object.

13. The clipping processing device as defined in claim 10, further comprising:

means for setting said initial value set by said initial-value setting means for each three-dimensional object configured of polygons, in accordance with a display state of said three-dimensional object.

14. The clipping processing device as defined in claim 1, wherein:

said interior-division-point calculation means within said clipping calculation means comprises means for performing perspective projection conversion with respect to a polygon to be processed, by modifying calculation coefficients that are used in interior-division-point calculation.

15. The clipping processing device as defined in claim 14, further comprising:

means for setting said initial value set by said initial-value setting means for each three-dimensional object configured of polygons, in accordance with a display state of said three-dimensional object.

16. The clipping processing device as defined in claim 1, further comprising:

means for setting said initial value set by said initial-value setting means for each three-dimensional object configured of polygons, in accordance with a display state of said three-dimensional object.

17. A three-dimensional simulator device comprising a clipping processing device as defined in claim 1, wherein said three-dimensional simulator device comprises:

an image synthesis means for synthesizing a field-of-view image as seen from an observer within a virtual three-dimensional space, using a polygon which has been subjected to clipping processing by said clipping processing device.

18. A clipping processing method for performing clipping processing with respect to a three-dimensional object represented by a plurality of polygons, using a priority memory means for storing priorities of clipping surfaces to be used in clipping processing, wherein said clipping processing method comprises:

an initial-value setting step for setting an initial value for said priorities of said clipping surfaces in said priority memory means;

a determining step for determining whether a polygon to be processed is in one of a display region, a boundary region, or an out-of-display region of said clipping surface, using said clipping surfaces in sequence from a clipping surface with the highest priority stored in said priority memory means;

a clipping calculation step for calculating interior division points between a polygon and a clipping surface when said determining step determines that said polygon to be processed is in said boundary region, and for performing calculation processing that invalidates said polygon when said determining step determines that said polygon is in said out-of-display region; and a modifying step for modifying the priorities in said priority memory means in such a manner that said clipping surface has the highest priority when said clipping calculation step determines that said polygon to be processed is in said out-of-display region of said clipping surface.

19. The clipping processing method as defined in claim 18, further comprising a step of:

performing preprocessing for the entirety of a three-dimensional object, before clipping processing is performed on a polygon that configures said three-dimensional object;

wherein said preprocessing step comprises the steps of:
setting a zone for trivial clipping of a given width shaped in such as manner as to include said clipping surface, and determining whether said three-dimensional object is in any of a display region, a boundary region, or an out-of-display region of said zone; and
omitting clipping processing for a polygon that configures the three-dimensional object when said determining step determines that said three-dimensional object is in said display region or out-of-display region of said zone, and for specifying that clipping processing is performed for a polygon that configures the three-dimensional object when said determining step determines that said three-dimensional object is in said boundary region of said zone.

20. The clipping processing method as defined in claim 18, wherein:

said initial value set in said initial-value setting step is set for each three-dimensional object configured of polygons, in accordance with a display state of said three-dimensional object.

* * * * *